US010085283B2

(12) United States Patent
Yoo et al.

(10) Patent No.: US 10,085,283 B2
(45) Date of Patent: Sep. 25, 2018

(54) ANTENNA SUBSET AND DIRECTIONAL CHANNEL ACCESS IN A SHARED RADIO FREQUENCY SPECTRUM BAND

(71) Applicant: QUALCOMM Incorporated, San Diego, CA (US)

(72) Inventors: Taesang Yoo, Riverside, CA (US); Tao Luo, San Diego, CA (US); Arumugam Chendamarai Kannan, San Diego, CA (US); Siddhartha Mallik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 87 days.

(21) Appl. No.: 14/972,344

(22) Filed: Dec. 17, 2015

(65) Prior Publication Data
US 2016/0192395 A1  Jun. 30, 2016

Related U.S. Application Data

(60) Provisional application No. 62/098,591, filed on Dec. 31, 2014.

(51) Int. Cl.
*H04W 74/08* (2009.01)
*H04W 16/14* (2009.01)
(Continued)

(52) U.S. Cl.
CPC ...... *H04W 74/0808* (2013.01); *H04B 7/0691* (2013.01); *H04B 7/0695* (2013.01);
(Continued)

(58) Field of Classification Search
None
See application file for complete search history.

(56) References Cited

U.S. PATENT DOCUMENTS 5,280,472 A   1/1994  Gilhousen et al.
2008/0117865 A1  5/2008  Li et al.
(Continued)

FOREIGN PATENT DOCUMENTS

EP   1108338 B1   11/2004

OTHER PUBLICATIONS

ISA/EP, International Search Report and Written Opinion of the International Searching Authority, Int'l. App. No. PCT/US2015/66746, dated Aug. 9, 2016, European Patent Office, Rijswijk, NL, 22 pgs.
(Continued)

*Primary Examiner* — Saba Tsegaye
(74) *Attorney, Agent, or Firm* — Holland & Hart LLP

(57) ABSTRACT

Techniques are provided for accessing a shared radio frequency spectrum band by selecting a subset antennas associated with a successful access procedure for accessing the shared radio frequency spectrum. In some examples, a wireless communication device, such as a network node, may perform a listen before talk (LBT) procedure for each of two or more subsets of antennas associated with the network node, and only those subsets of antennas that pass the LBT procedure are used for transmissions during the associated time period, while other antennas are idle, or used for transmissions on another radio frequency spectrum band during the associated time period. In some examples, antennas of a wireless communication device may perform an access procedure utilizing beamforming capabilities of associated antennas to determine one or more different spatial directions that may provide access to the shared radio frequency spectrum band.

20 Claims, 16 Drawing Sheets

(51) Int. Cl.
    H04L 5/00      (2006.01)
    H04B 7/06      (2006.01)
    H04B 7/08      (2006.01)
    H04W 72/04     (2009.01)

(52) U.S. Cl.
    CPC ........... *H04B 7/088* (2013.01); *H04B 7/0874* (2013.01); *H04L 5/0048* (2013.01); *H04W 16/14* (2013.01); *H04W 74/08* (2013.01); *H04W 72/044* (2013.01)

(56)  References Cited

U.S. PATENT DOCUMENTS

| | | | |
|---|---|---|---|
| 2011/0128895 A1 | 6/2011 | Sadek et al. | |
| 2012/0201213 A1* | 8/2012 | Banerjea | H04W 72/0453 370/329 |
| 2014/0161002 A1* | 6/2014 | Gauvreau | H04W 16/24 370/280 |
| 2014/0376466 A1 | 12/2014 | Jeong et al. | |
| 2016/0105897 A1* | 4/2016 | Liu | H04W 72/1226 370/235 |
| 2016/0135080 A1* | 5/2016 | Pazhyannur | H04W 16/14 370/329 |
| 2016/0135189 A1* | 5/2016 | Chandrasekhar | H04W 72/0453 370/329 |

OTHER PUBLICATIONS

ISA/EPO, Partial International Search Report of the International Searching Authority, Int'l. App. No. PCT/US2015/066746, dated Mar. 29, 2016, European Patent Office, Rijswijk, NL, 7 pgs.

\* cited by examiner

ANTENNA SUBSET AND DIRECTIONAL CHANNEL ACCESS IN A SHARED RADIO FREQUENCY SPECTRUM BAND

CROSS REFERENCES

The present application for patent claims priority to U.S. Provisional Patent Application No. 62/098,591 by Yoo et al., entitled "Per Antenna and Directional Channel Access in a Shared Radio Frequency Spectrum Band," filed Dec. 31, 2014, assigned to the assignee hereof.

BACKGROUND

Field of the Disclosure

The present disclosure relates to wireless communication systems, and more particularly, for example, to antenna subset and directional antenna channel access in a shared radio frequency spectrum band.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, single-carrier frequency-division multiple access (SC-FDMA) systems, and orthogonal frequency-division multiple access (OFDMA) systems.

By way of example, a wireless multiple-access communication system may include a number of base stations, each simultaneously supporting communication for multiple communication devices, where each device may be referred to as a user equipment (UE). A base station may communicate with UEs on downlink channels (e.g., for transmissions from a base station to a UE) and uplink channels (e.g., for transmissions from a UE to a base station).

Some modes of communication may enable communication between a base station and a UE over a shared radio frequency spectrum band, or over different radio frequency spectrum bands (e.g., a dedicated radio frequency spectrum band and a shared radio frequency spectrum band) of a cellular network. With increasing data traffic in cellular networks that use a dedicated (e.g., licensed) radio frequency spectrum band, an offloading of at least some data traffic to a shared radio frequency spectrum band may provide a cellular operator with opportunities for enhanced data transmission capacity. A shared radio frequency spectrum band may also provide service in areas where access to a dedicated radio frequency spectrum band is unavailable.

Prior to gaining access to, and communicating over, a shared radio frequency spectrum band, a base station or UE may perform a listen before talk (LBT) procedure to contend for access to the shared radio frequency spectrum band. An LBT procedure may include performing a clear channel assessment (CCA) procedure to determine whether a channel of the shared radio frequency spectrum band is available. When it is determined that the channel of the shared radio frequency spectrum band is available, the base station or UE may transmit one or more channel reservation signals (e.g., a pilot sequence such as one or more channel usage beacon signals (CUBS)) over the channel, to reserve the channel. The channel reservation signal(s) may be transmitted over the channel until a next subframe boundary, at which time a data or control transmission may be made over the channel.

SUMMARY

The present disclosure may relate generally to wireless communications systems, and more particularly to improved systems, methods, or apparatuses for accessing shared radio frequency spectrum band by selecting a subset of antennas associated with a wireless communication device for transmission that pass an access procedure for accessing the shared radio frequency spectrum band while not selecting other antennas that do not pass the access procedure. In some examples, a wireless communication device, such as a base station or network node, may perform a listen-before-talk (LBT) procedure for each of two or more subsets of antennas available to the wireless communication device, and those subsets of antennas that pass the LBT procedure may be selected for transmissions during the associated time period while other antennas may remain idle or used for communications in a different radio frequency spectrum band during the associated time period. In some examples, antennas of a wireless communication device may perform an access procedure utilizing beamforming capabilities of associated antennas to determine one or more different spatial directions that may provide access to the shared radio frequency spectrum band.

A method of communication at a wireless communication device is described. The method may include performing a first access procedure for access to a shared radio frequency spectrum band during a time period using a first subset of antennas of a base station, performing a second access procedure for access to the shared radio frequency spectrum band during the time period using a second subset of antennas of the base station different from the first subset, identifying that the first subset of antennas can access the shared radio frequency spectrum band based at least in part on performing the first access procedure, and accessing the shared radio frequency spectrum band using the first subset of antennas. Although the method is described herein with reference to a base station, in various examples the method may be performed by any of a base station, a UE, or any other network node having a plurality of antennas for accessing a shared radio frequency spectrum band.

An apparatus for communication at a wireless communication device is described. The apparatus may include means for performing a first access procedure for access to a shared radio frequency spectrum band during a time period using a first subset of antennas of a base station, means for performing a second access procedure for access to the shared radio frequency spectrum band during the time period using a second subset of antennas of the base station different from the first subset, means for identifying that the first subset of antennas can access the shared radio frequency spectrum band based at least in part on performing the first access procedure, and means for accessing the shared radio frequency spectrum band using the first subset of antennas. Although the apparatus is described herein with reference to a base station, in various examples the apparatus may form all or a portion of any of a base station, a UE, or any other network node having a plurality of antennas for accessing a shared radio frequency spectrum band.

Another apparatus for communication at a wireless communication device is described. The apparatus may include a processor, memory in electronic communication with the processor, and instructions stored in the memory. The instructions may be executable by the processor to cause the apparatus to perform a first access procedure for access to a shared radio frequency spectrum band during a time period using a first subset of antennas of a base station, perform a second access procedure for access to the shared radio frequency spectrum band during the time period using a second subset of antennas of the base station different from the first subset, identify that the first subset of antennas can access the shared radio frequency spectrum band based at least in part on performing the first access procedure, and access the shared radio frequency spectrum band using the first subset of antennas. Although the apparatus is described herein with reference to a base station, in various examples the instructions may cause any of a base station, a UE, or any other network node having a plurality of antennas to complete the described steps for accessing a shared radio frequency spectrum band.

A non-transitory computer-readable medium storing code for communication at a wireless communication device is described. The code may include instructions executable to perform a first access procedure for access to a shared radio frequency spectrum band during a time period using a first subset of antennas of a base station, perform a second access procedure for access to the shared radio frequency spectrum band during the time period using a second subset of antennas of the base station different from the first subset, identify that the first subset of antennas can access the shared radio frequency spectrum band based at least in part on performing the first access procedure, and access the shared radio frequency spectrum band using the first subset of antennas. Although the code is described herein with reference to a base station, in various examples the code may be executable to perform the described steps at any of a base station, a UE, or any other network node having a plurality of antennas for accessing a shared radio frequency spectrum band.

In some examples of the method, apparatuses, or non-transitory computer-readable medium described above, the first and second access procedures may each include a clear channel assessment (CCA) using one or more antennas associated with the first subset of antennas and the second subset of antennas, respectively. Additionally or alternatively, in some examples the first and second subsets of antennas may each include one or more antennas having a different geographic location than one or more other antennas of the wireless communication device.

In some examples of the method, apparatuses, or non-transitory computer-readable medium described above, accessing the shared radio frequency spectrum band using the first subset of antennas may include steps, features, means, or instructions for transmitting a preamble indicating a successful access procedure using the first subset of antennas. Additionally or alternatively, in some examples the preamble may include a common pilot signal associated with a logical antenna port, and the logical antenna port may be associated with two or more antennas of the wireless communication device. In some examples, the logical antenna port may be associated with at least one antenna from the first subset of antennas and at least one antenna from the second subset of antennas.

Some examples of the method, apparatuses, or non-transitory computer-readable medium described above may include steps, features, means, or instructions for transmitting the common pilot signal from less than all of the antennas associated with the logical antenna port. For example, the common pilot signal may be transmitted from the first subset of antennas but not from the second subset of antennas. Additionally or alternatively, in some examples the preamble may include an identifier that indicates which antennas are transmitting the common pilot signal.

In some examples of the method, apparatuses, or non-transitory computer-readable medium described above, the preamble may include one or more antenna-specific pilot signals, each associated with one or more antennas of the first subset of antennas. Additionally or alternatively, in some examples the preamble may include one or more dedicated pilot signals associated with a receiver.

Some examples of the method, apparatuses, or non-transitory computer-readable medium described above, may include steps, features, means, or instructions for transmitting each of the dedicated pilot signals using a logical antenna port and one or more physical antennas associated with the first subset of antennas may be indicated using precoding. Additionally or alternatively, some examples may include steps, features, means, or instructions for identifying that the second subset of the set of antennas can access the shared radio frequency spectrum band during the period based at least in part on performing the second access procedure, and accessing the shared radio frequency spectrum band using the first and second subsets of antennas.

In some examples of the method, apparatuses, or non-transitory computer-readable medium described above, accessing the shared radio frequency spectrum band using the first and second subsets of antennas may include steps, features, means, or instructions for transmitting a preamble indicating a successful access procedure using the first subset of antennas and the second subset of antennas, the transmitting including frequency division multiplexing (FDM) the preamble between the first and second subsets of antennas. Additionally or alternatively, in some examples accessing the shared radio frequency spectrum band using the first and second subsets of antennas may include steps, features, means, or instructions for transmitting a preamble indicating a successful access procedure using the first subset of antennas and the second subset of antennas, the preamble including a plurality of symbols, and the transmitting including transmitting different preamble symbols from the first and second subsets of antennas for a first portion of the plurality of preamble symbols and transmitting a same preamble symbol from the first and second subsets of antennas for a second portion of the of the plurality of preamble symbols.

Some examples of the method, apparatuses, or non-transitory computer-readable medium described above may include steps, features, means, or instructions for identifying that the second subset of the set of antennas can access the shared radio frequency spectrum band after the first subset of antennas has accessed the shared radio frequency spectrum band, and accessing the shared radio frequency spectrum band using the second subset of antennas. Additionally or alternatively, in some examples identifying that the second subset of antennas can access the shared radio frequency spectrum band may include steps, features, means, or instructions for performing the second access procedure for access to the shared radio frequency spectrum band using the second subset of antennas, the second access procedure including cancelling of transmissions of the first subset of antennas.

In some examples of the method, apparatuses, or non-transitory computer-readable medium described above, accessing the shared radio frequency spectrum band using the second subset of antennas may include steps, features, means, or instructions for determining that the first subset of antennas is transmitting a preamble sequence, and joining in the transmission of the preamble sequence. Additionally or alternatively, some examples may include steps, features, means, or instructions for identifying that a second set of antennas associated with a second base station can access the shared radio frequency spectrum band after the first subset of antennas has accessed the shared radio frequency spectrum band, and accessing the shared radio frequency spectrum band using one or more antennas of the second set of antennas.

Some examples of the method, apparatuses, or non-transitory computer-readable medium described above may include steps, features, means, or instructions for performing a synchronized access procedure using the first subset of antennas and one or more antennas of the second set of antennas. Additionally or alternatively, some examples may include steps, features, means, or instructions for coordinating downlink power control in the first subset of antennas to increase the likelihood that the second subset of antennas will gain channel access using the access procedure.

A method of communication at a wireless communication device is described. The method may include performing an access procedure directed along a first spatial direction and along a second spatial direction for access to a shared radio frequency spectrum band using two or more antennas, determining that the first spatial direction of transmission is an available direction for accessing the shared radio frequency spectrum band based at least in part on performing the access procedure, and accessing the shared radio frequency spectrum band using the two or more antennas to transmit along the available direction of transmission.

An apparatus for communication at a wireless communication device is described. The apparatus may include means for performing an access procedure directed along a first spatial direction and along a second spatial direction for access to a shared radio frequency spectrum band using two or more antennas, means for determining that the first spatial direction of transmission is an available direction for accessing the shared radio frequency spectrum band based at least in part on performing the access procedure, and means for accessing the shared radio frequency spectrum band using the two or more antennas to transmit along the available direction of transmission.

Another apparatus for communication at a wireless communication device is described. The apparatus may include a processor, memory in electronic communication with the processor, and instructions stored in the memory. The instructions may be executable by the processor to cause the apparatus to perform an access procedure directed along a first spatial direction and a second spatial direction for access to a shared radio frequency spectrum band using two or more antennas, determine that the first spatial direction of transmission is an available direction for accessing the shared radio frequency spectrum band based at least in part on performing the access procedure, and access the shared radio frequency spectrum band using the two or more antennas to transmit along the available direction of transmission.

A non-transitory computer-readable medium storing code for communication at a wireless communication device is described. The code may include instructions executable to perform an access procedure directed along a first spatial direction and a second spatial direction for access to a shared radio frequency spectrum band using two or more antennas, determine that the first spatial direction of transmission is an available direction for accessing the shared radio frequency spectrum band based at least in part on performing the access procedure, and access the shared radio frequency spectrum band using the two or more antennas to transmit along the available direction of transmission.

In some examples of the method, apparatuses, or non-transitory computer-readable medium described above, determining the available direction of transmission may include steps, features, means, or instructions for performing a first clear channel assessment (CCA) associated with the shared radio frequency spectrum band in the first spatial direction, performing a second CCA associated with the shared radio frequency spectrum band in the second spatial direction, and determining that the CCAs indicate that the shared radio frequency spectrum band is available for transmission in the first spatial direction. Additionally or alternatively, in some examples the first and second CCAs may each include measuring an energy level or detecting a known sequence at the two or more antennas according to a precoding procedure associated with the respective spatial direction.

Some examples of the method, apparatuses, or non-transitory computer-readable medium described above may include steps, features, means, or instructions for providing the energy level or detected sequence strength to one or more other transmitters in a wireless communications system. Additionally or alternatively, in some examples determining the available direction of transmission may include steps, features, means, or instructions for determining that two or more spatial directions are available for accessing the shared radio frequency spectrum band, and accessing the shared radio frequency spectrum band may include steps, features, means or instructions for accessing the shared radio frequency spectrum band for one or more of the multiple spatial directions available for accessing the shared radio frequency spectrum band.

Some examples of the method, apparatuses, or non-transitory computer-readable medium described above may include steps, features, means, or instructions for selecting one or more receivers that are to receive transmissions using the shared radio frequency spectrum band based on a location of the receivers and the two or more spatial directions available for accessing the shared radio frequency spectrum band. Additionally or alternatively, some examples may include steps, features, means, or instructions for selecting a precoding matrix for transmissions over the shared radio frequency spectrum band based at least on part on the available direction of transmission.

In some examples of the method, apparatuses, or non-transitory computer-readable medium described above, the two or more antennas may include a first subset of a set of antennas, and performing the access procedure may include steps, features, means, or instructions for performing the access procedure for access to the shared radio frequency spectrum band using at least the first subset of antennas and a second subset of antennas different than the first subset of antennas. Additionally or alternatively, some examples may include steps, features, means, or instructions for identifying that the first subset of antennas can access the shared radio frequency spectrum band in the available direction of transmission based at least in part on performing the access procedure using the first and second subsets of antennas.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
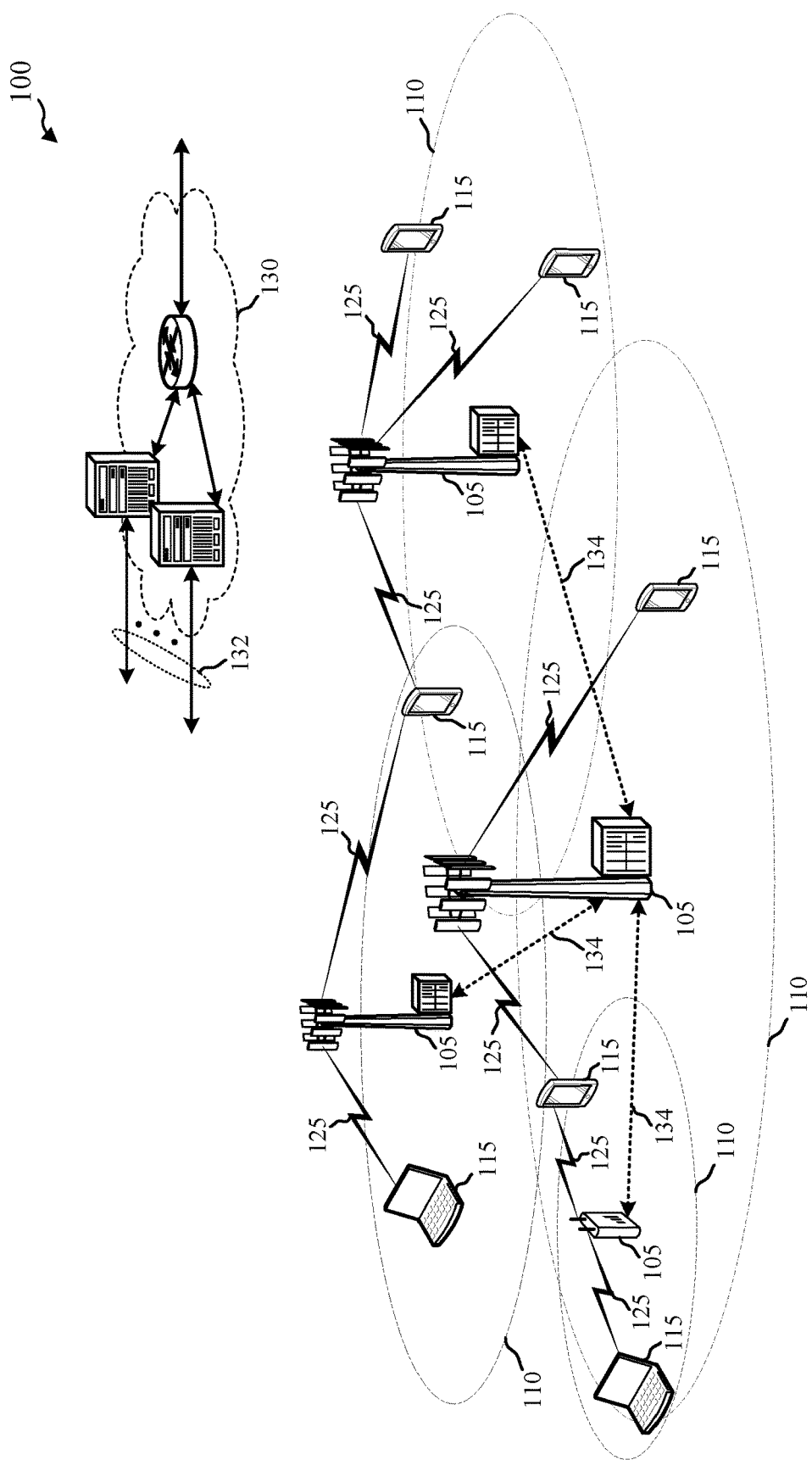
FIG. 1 illustrates an example of a wireless communication system, in accordance with aspects of the present disclosure.

Techniques are described in which a shared radio frequency spectrum band is used for at least a portion of communications over a wireless communication system. In some examples, the shared radio frequency spectrum band may be used for LTE/LTE-A communications. The shared radio frequency spectrum band may be used in combination with, or independent from, a dedicated radio frequency spectrum band. The dedicated radio frequency spectrum band may be a radio frequency spectrum band for which transmitting apparatuses may not be required to contend for access because the radio frequency spectrum band is licensed to particular users, such as a licensed radio frequency spectrum band usable for LTE/LTE-A communications. The shared radio frequency spectrum band may be a radio frequency spectrum band for which a device may need to contend for access (e.g., a radio frequency spectrum band that is available for unlicensed use, such as Wi-Fi use, or a radio frequency spectrum band that is available for use by multiple operators in an equally shared or prioritized manner).

With increasing data traffic in cellular networks that use a dedicated radio frequency spectrum band, an offloading of at least some data traffic to a shared radio frequency spectrum band may provide a cellular operator (e.g., an operator of a public land mobile network (PLMN) or a coordinated set of base stations defining a cellular network, such as an LTE/LTE-A network) with opportunities for enhanced data transmission capacity. Use of a shared radio frequency spectrum band may also provide service in areas where access to a dedicated radio frequency spectrum band is unavailable. As noted above, before communicating over a shared radio frequency spectrum band, transmitting apparatuses may perform an LBT procedure to gain access to the medium. Such an LBT procedure may include performing a CCA procedure (or extended CCA procedure) to determine whether a channel of the shared radio frequency spectrum band is available. When it is determined that the channel of the shared radio frequency spectrum band is available, a preamble sequence, such as a CUBS or a Wi-Fi preamble, may be transmitted to reserve the channel. When it is determined that a channel is not available, a CCA procedure (or extended CCA procedure (eCCA)) may be performed for the channel again at a later time.

In some deployments, a CCA procedure or eCCA procedure may be performed for individual wireless communication devices, such as individual base stations, and if the shared radio frequency spectrum band is available each antenna associated with the base stations may transmit using the shared radio frequency spectrum band. In some examples, antennas belonging to a wireless communication device may be distributed over a geographic area (e.g., remote radio heads (RRHs) in a coordinated multipoint (CoMP) deployment of a base station, or cell of a base station, or a UE having associated distributed antenna heads, such as those that may, for example be available at a docking station). In such cases, different antennas associated with the wireless communication device may experience different interference conditions. Some antennas may receive signals that suggest or declare that the shared radio frequency spectrum band is busy due to a nearby interferer (e.g., a Wi-Fi access point), while the other antennas associated with the wireless communication device may be relatively far away from the interferer and may not receive signals that suggest or declare that the shared radio frequency spectrum band is busy (e.g., other antennas may provide an indication that the shared radio frequency spectrum band is clear or otherwise available).

Various examples described herein provide that a CCA procedure, eCCA procedure, or other LBT procedure, may be performed by employing one or more subsets of the antennas available to a wireless communication device, where a subset of antennas may refer to any combination of one or more antennas associated with the wireless communication device, but fewer than all of the antennas associated with the wireless communication device. Furthermore, in various examples an antenna may be employed in more than one subset of antennas used to perform various access procedures (e.g., a first access procedure may employ a first subset of antennas consisting of antennas A and B, and a second access procedure may employ a second subset of antennas consisting of antennas B and C). Such deployments and access procedures may allow one or more antenna(s) to transmit data using the portion of the shared radio frequency spectrum band associated with the successful contention without causing disruption to an interferer, while other antennas may remain idle or are otherwise employed for other communications, where in various examples the other communications may include communications employing a different radio frequency spectrum band. In some examples, by suppressing one or more antennas at a wireless communications device during an access procedure and subsequent transmissions, interference in a wireless communications system may be reduced, thereby improving the ability for various devices to employ a shared radio frequency spectrum band.

In some examples, beamforming may be implemented at two or more antennas of a wireless communications device, such as an array of antennas, to perform a directional access procedure using a shared radio frequency spectrum band. In various examples, the access procedure may include any combination of interpreting received signals along one or more selected directions and/or transmitting access procedure signals along one or more selected directions. By directing transmissions corresponding to an access procedure, and subsequent control and/or data transmissions, along one or more selected spatial directions, a wireless communication device may be able to transmit data on a shared radio frequency spectrum band without causing disruption to an interferer. In some examples, by directing one or more antennas at a wireless communications device to send and/or receive signals along one or more selected spatial directions during an access procedure and subsequent transmissions, interference in a wireless communications system may be reduced, thereby improving the ability for various devices to employ a shared radio frequency spectrum band.

When it is determined that the channel of the shared radio frequency spectrum band is available, the wireless communications device, which may be a base station or UE, may transmit one or more pilot signal sequences (e.g., one or more channel usage beacon signals (CUBS)) over the channel, to reserve the channel using, for example, the selected subset of antennas or a beamformed transmission along the selected spatial direction(s). In some examples, the pilot signal(s) may be transmitted over the channel until a next subframe boundary, at which time a data or control transmission may be made over the channel. In other examples, the channel reservation signal(s) may be transmitted over the channel for a shorter duration or not at all. A data or control transmission may then begin during a symbol period of the subframe in which contention for access to the shared radio frequency spectrum band is won.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communication system 100, in accordance with aspects of the present disclosure. The wireless communication system 100 may include base stations 105, user equipments (UEs) 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X2, etc.), which may be wired or wireless communication links.

The base stations 105 may wirelessly communicate with the UEs 115 via one or more base station antennas. In some examples, base station antennas may be located within one or more base station antenna arrays. One or more base station antennas or base station antenna arrays may be co-located at an antenna assembly, such as an antenna tower. Additionally or alternatively, base station antennas or base station antenna arrays associated with a base station 105 may be located in diverse geographic locations. A base station 105 may use multiple base antennas or base station antenna arrays to conduct beamforming operations for directional communications with one or more UEs 115.

Each of the base stations 105 may provide communication coverage for a respective geographic coverage area 110. In various examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). Each of the base stations 105 may be configured to communicate using one or more communication technologies, and there may be overlapping geographic coverage areas 110 for different technologies.

In some examples, the wireless communication system 100 may include an LTE/LTE-A network. In LTE/LTE-A networks, the term evolved Node B (eNB) may be used to describe the base stations 105, while the term UE may be used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., dedicated, shared, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. A base station may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Communication networks that may accommodate various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro base stations, small cell base stations, relay base stations, and the like.

The communication links 125 shown in wireless communication system 100 may include downlink (DL) transmissions, from a base station 105 to a UE 115, or uplink (UL) transmissions, from a UE 115 to a base station 105. The downlink transmissions may be referred to as forward link transmissions, while the uplink transmissions may be referred to as reverse link transmissions. The downlink transmissions may include, for example, a physical downlink shared channel (PDSCH), a physical downlink control channel (PDCCH; e.g., for transmission over a dedicated radio frequency spectrum band), or an enhanced or evolved PDCCH (EPDCCH; e.g., for transmission over a shared radio frequency spectrum band). The uplink transmissions may include, for example, a physical uplink shared channel (PUSCH) or a physical uplink control channel (PUCCH).

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data. Additionally or alternatively, multiple antennas may be employed by a base station 105 or a UE to perform various beamforming techniques to transmit signals along a selected spatial direction, and/or interpret received signals along a selected spatial direction In various examples, the multiple antennas associated with a base station 105 or a UE 115 may be co-located antennas and/or antennas with different geographic locations.

In some examples, the wireless communication system 100 may support operation over a dedicated radio frequency spectrum band (e.g., a radio frequency spectrum band for which transmitting apparatuses may not be required to contend for access because the radio frequency spectrum band is licensed or otherwise dedicated to particular users for particular uses, such as a licensed radio frequency spectrum band usable for LTE/LTE-A communications) or a shared radio frequency spectrum band (e.g., a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner)).

As mentioned above, when using a shared radio frequency spectrum band a base station 105 or UE 115 may perform a channel access procedure, such as a CCA or eCCA procedure. Various examples described herein provide that a CCA procedure, eCCA procedure, or other LBT procedure, may be performed on a per-antenna (or group of antennas) basis for subsets of antennas associated with either the base station 105 or the UE 115 performing the procedure. Such deployments and access procedures may allow one or more antenna(s) of the wireless communications device to transmit data without causing disruption to neighboring devices (e.g., Wi-Fi access point) that are generating interference at one of the antennas (or at one group of antennas). In certain examples, as also mentioned above, beamforming may be implemented by a wireless communication device to perform a directional access procedure along one or more selected spatial directions, which also may allow one or more antenna(s) (e.g., an array of antennas employing a beamforming technique) to transmit data without causing disruption to a device that is generating interference along a particular spatial direction.

Figure 2:
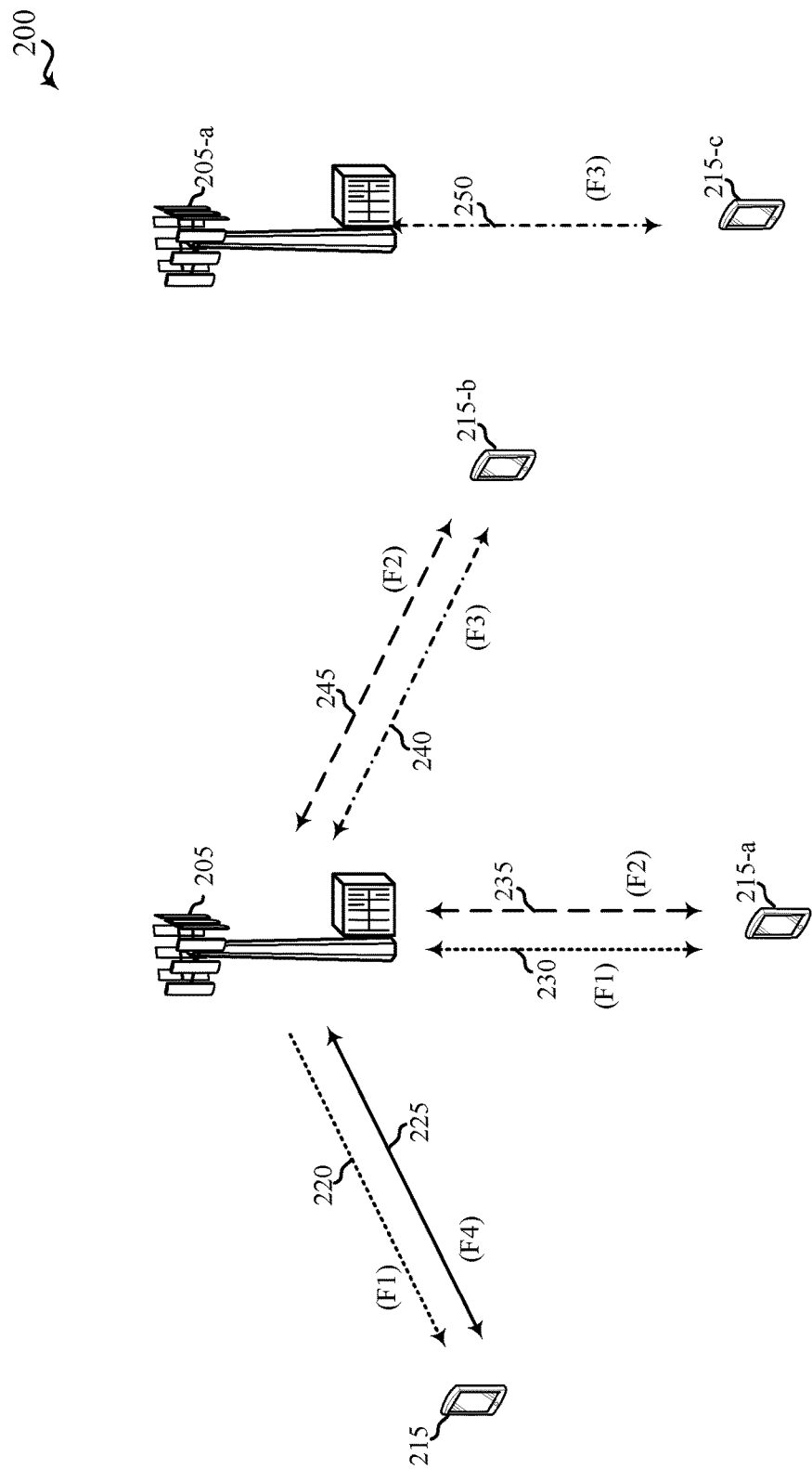
FIG. 2 illustrates a wireless communication system in which LTE/LTE-A may be deployed under different scenarios using a shared radio frequency spectrum band, in accordance with aspects of the present disclosure.

FIG. 2 illustrates a wireless communication system 200 in which LTE/LTE-A may be deployed under different scenarios using a shared radio frequency spectrum band, in accordance with aspects of the present disclosure. More specifically, FIG. 2 illustrates examples of a supplemental downlink mode (also referred to as a licensed assisted access mode), a carrier aggregation mode, and a standalone mode in which LTE/LTE-A is deployed using a shared radio frequency spectrum band. The wireless communication system 200 may be an example of portions of the wireless communication system 100 described with reference to FIG. 1. Moreover, a first base station 205 and a second base station 205-*a* may be examples of aspects of one or more of the base stations 105 described with reference to FIG. 1, while a first UE 215, a second UE 215-*a*, a third UE 215-*b*, and a fourth UE 215-*c* may be examples of aspects of one or more of the UEs 115 described with reference to FIG. 1.

In the example of a supplemental downlink mode (e.g., a licensed assisted access mode) in the wireless communication system 200, the first base station 205 may transmit OFDMA waveforms to the first UE 215 using a downlink channel 220. The downlink channel 220 may be associated with a frequency F1 in a shared radio frequency spectrum band. The first base station 205 may transmit OFDMA waveforms to the first UE 215 using a first bidirectional link 225 and may receive SC-FDMA waveforms from the first UE 215 using the first bidirectional link 225. The first bidirectional link 225 may be associated with a frequency F4 in a dedicated radio frequency spectrum band. The downlink channel 220 in the shared radio frequency spectrum band and the first bidirectional link 225 in the dedicated radio frequency spectrum band may operate contemporaneously. The downlink channel 220 may provide a downlink capacity offload for the first base station 205. In some examples, the downlink channel 220 may be used for unicast services (e.g., addressed to one UE) or for multicast services (e.g., addressed to several UEs). This scenario may occur with any service provider (e.g., a mobile network operator (MNO)) that uses a dedicated radio frequency spectrum band and needs to relieve some of the traffic or signaling congestion.

In one example of a carrier aggregation mode in the wireless communication system 200, the first base station 205 may transmit OFDMA waveforms to the second UE 215-*a* using a second bidirectional link 230 and may receive OFDMA waveforms, SC-FDMA waveforms, or resource block interleaved FDMA waveforms from the second UE 215-*a* using the second bidirectional link 230. The second bidirectional link 230 may be associated with the frequency F1 in the shared radio frequency spectrum band. The first base station 205 may also transmit OFDMA waveforms to the second UE 215-*a* using a third bidirectional link 235 and may receive SC-FDMA waveforms from the second UE 215-*a* using the third bidirectional link 235. The third bidirectional link 235 may be associated with a frequency F2 in a dedicated radio frequency spectrum band. The second bidirectional link 230 may provide a downlink and uplink capacity offload for the first base station 205. Like the supplemental downlink (e.g., the licensed assisted access mode) described above, this scenario may occur with any service provider (e.g., MNO) that uses a dedicated radio frequency spectrum band and needs to relieve some of the traffic or signaling congestion.

In another example of a carrier aggregation mode in the wireless communication system 200, the first base station 205 may transmit OFDMA waveforms to the third UE 215-*b* using a fourth bidirectional link 240 and may receive OFDMA waveforms, SC-FDMA waveforms, or resource block interleaved waveforms from the third UE 215-*b* using the fourth bidirectional link 240. The fourth bidirectional link 240 may be associated with a frequency F3 in the shared radio frequency spectrum band. The first base station 205 may also transmit OFDMA waveforms to the third UE 215-*b* using a fifth bidirectional link 245 and may receive SC-FDMA waveforms from the third UE 215-*b* using the fifth bidirectional link 245. The fifth bidirectional link 245 may be associated with the frequency F2 in the dedicated radio frequency spectrum band. The fourth bidirectional link 240 may provide a downlink and uplink capacity offload for the first base station 205. This example and those provided above are presented for illustrative purposes and there may be other similar modes of operation or deployment scenarios that combine LTE/LTE-A in a dedicated radio frequency spectrum band and use a shared radio frequency spectrum band for capacity offload.

As described above, one type of service provider that may benefit from the capacity offload offered by using LTE/LTE-A in a shared radio frequency spectrum band is a traditional MNO having access rights to an LTE/LTE-A dedicated radio frequency spectrum band. For these service providers, an operational example may include a boot-strapped mode (e.g., supplemental downlink (e.g., licensed assisted access), carrier aggregation) that uses the LTE/

LTE-A primary component carrier (PCC) on the dedicated radio frequency spectrum band and at least one secondary component carrier (SCC) on the shared radio frequency spectrum band.

In the carrier aggregation mode, data and control may, for example, be communicated in the dedicated radio frequency spectrum band (e.g., via first bidirectional link 225, third bidirectional link 235, and fifth bidirectional link 245) while data may, for example, be communicated in the shared radio frequency spectrum band (e.g., via second bidirectional link 230 and fourth bidirectional link 240). The carrier aggregation mechanisms supported when using a shared radio frequency spectrum band may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second base station 205-a may transmit OFDMA waveforms to the fourth UE 215-c using a bidirectional link 250 and may receive OFDMA waveforms, SC-FDMA waveforms, or resource block interleaved FDMA waveforms from the fourth UE 215-c using the bidirectional link 250. The bidirectional link 250 may be associated with the frequency F3 in the shared radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a dedicated radio frequency spectrum band.

In some examples, a transmitting apparatus such as one of the base stations 105, 205, or 205-a described with reference to FIG. 1 or 2, or one of the UEs 115, 215, 215-a, 215-b, or 215-c described with reference to FIG. 1 or 2, may use a gating interval to gain access to a channel of a shared radio frequency spectrum band (e.g., to a physical channel of the shared radio frequency spectrum band). In some examples, the gating interval may be periodic. For example, the periodic gating interval may be synchronized with at least one boundary of an LTE/LTE-A radio interval. The gating interval may define the application of a contention-based protocol, such as an LBT protocol based on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a clear channel assessment (CCA or eCCA) procedure. The outcome of the CCA procedure may indicate to the transmitting apparatus whether a channel of a shared radio frequency spectrum band is available or in use for the gating interval (also referred to as an LBT radio frame). When a CCA procedure indicates that the channel is available for a corresponding LBT radio frame (e.g., "clear" for use), the transmitting apparatus may reserve or use the channel of the shared radio frequency spectrum band during part or all of the LBT radio frame. When the CCA procedure indicates that the channel is not available (e.g., that the channel is in use or reserved by another transmitting apparatus), the transmitting apparatus may be prevented from using the channel during the LBT radio frame.

Figure 3:
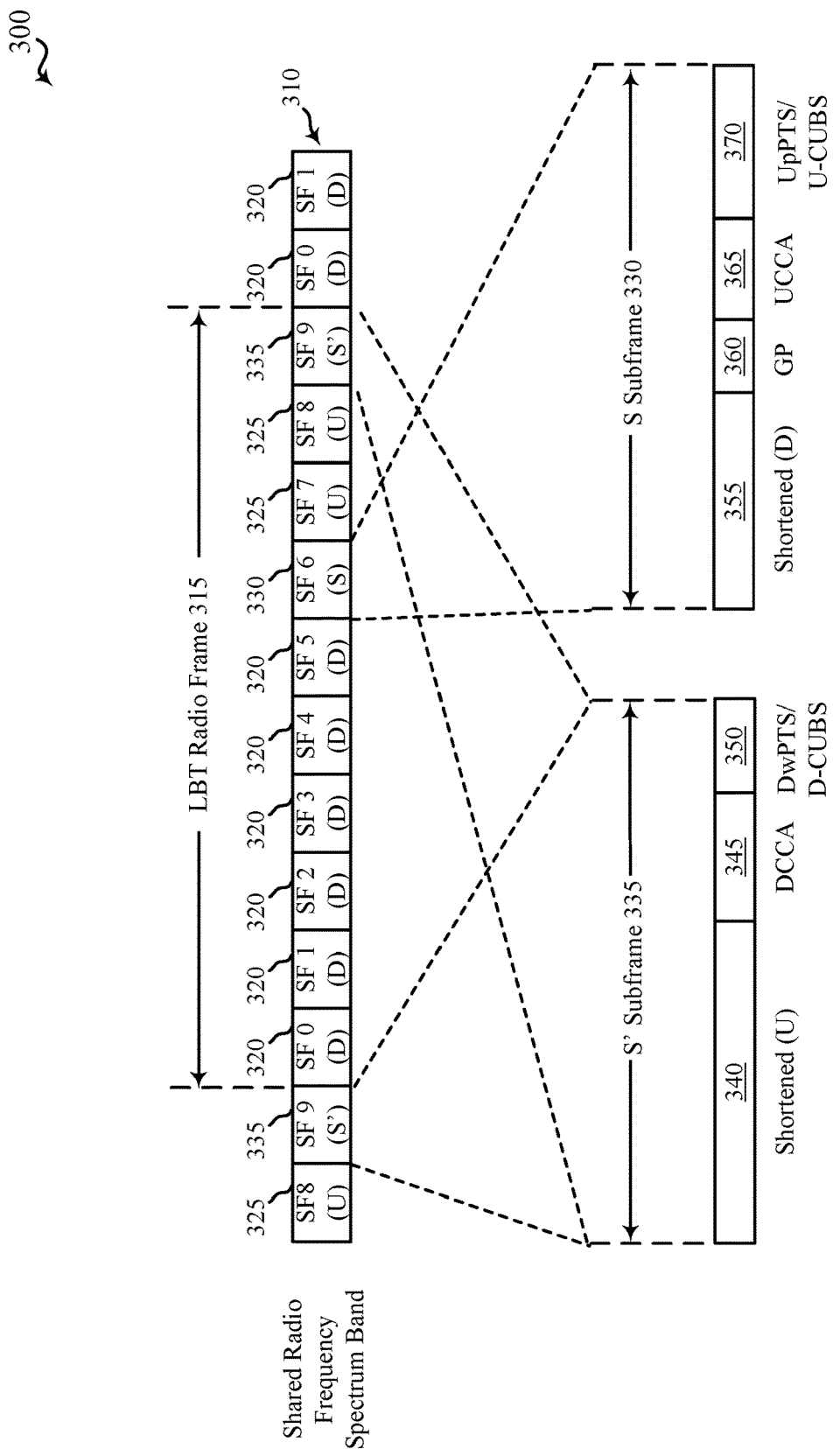
FIG. 3 illustrates an example of a wireless communication over a shared radio frequency spectrum band, in accordance with aspects of the present disclosure.

FIG. 3 illustrates an example 300 of a wireless communication 310 over a shared radio frequency spectrum band, in accordance with various aspects of the present disclosure. In some examples, the wireless communication 310 may include one or more component carriers, which component carrier(s) may be transmitted, for example, as part of a transmission made according to the supplemental downlink mode (e.g., the licensed assisted access mode), the carrier aggregation mode, or the standalone mode described with reference to FIG. 2.

In some examples, an LBT radio frame 315 of the wireless communication 310 may have a duration of ten milliseconds and include a number of downlink (D) subframes 320, a number of uplink (U) subframes 325, and two types of special subframes, an S subframe 330 and an S' subframe 335. The S subframe 330 may provide a transition between downlink subframes 320 and uplink subframes 325, while the S' subframe 335 may provide a transition between uplink subframes 325 and downlink subframes 320 and, in some examples, a transition between LBT radio frames.

During a second portion 345 of the S' subframe 335, a downlink clear channel assessment (DCCA) procedure may be performed by one or more base stations, such as one or more of the base stations 105, 205, or 205-a described with reference to FIG. 1 or 2, to reserve, for a period of time, a channel of the shared radio frequency spectrum band over which the wireless communication 310 occurs. Following a successful DCCA procedure by a base station, the base station may transmit a preamble sequence in a third portion 350 of the S' subframe 335, such as a channel usage beacon signal (CUBS) (e.g., a downlink CUBS (D-CUBS)) to provide an indication to other base stations or apparatuses (e.g., UEs, Wi-Fi access points, etc.) that the base station has reserved the channel. In some examples, a D-CUB S may be transmitted using a plurality of interleaved resource blocks. Transmitting a D-CUB S in this manner may enable the D-CUBS to occupy at least a certain percentage of the available frequency bandwidth of the shared radio frequency spectrum band and satisfy one or more regulatory requirements (e.g., a requirement that transmissions over the shared radio frequency spectrum band occupy at least 80% of the available frequency bandwidth). The D-CUB S may in some examples take a form similar to that of an LTE/LTE-A cell-specific reference signal (CRS) or a channel state information reference signal (CSI-RS). In deployments where multiple antennas, or groups of antennas, are present in a cell, all or part of the preamble sequence may be transmitted using frequency division multiplexing (FDM) among the multiple antennas or antenna groups. When the DCCA procedure fails, the D-CUB S may optionally not be transmitted.

The S' subframe 335 may include a plurality of orthogonal frequency-division multiplexed (OFDM) symbol periods (e.g., 14 OFDM symbol periods). A first portion 340 of the S' subframe 335 may be used by a number of UEs as a shortened uplink (U) period. The second portion 345 of the S' subframe 335 may be used for the DCCA procedure. The third portion 350 of the S' subframe 335 may be used by one or more base stations that successfully contend for access to the channel of the shared radio frequency spectrum band as a downlink pilot time slot (DwPTS) or to transmit the D-CUBS. For transmissions having a normal cyclic prefix (CP), possible DwPTS lengths include {3, 6, 9, 10, 11, 12} symbol periods. For transmissions having an extended CP, possible DwPTS lengths include {3, 5, 8, 9, 10} symbol periods.

During a third portion 365 of the S subframe 330, an uplink CCA (UCCA) procedure may be performed by one or more UEs, such as one or more of the UEs 115, 215, 215-a, 215-b, or 215-c described above with reference to FIG. 1 or 2, to reserve, for a period of time, the channel over which the wireless communication 310 occurs. Following a successful UCCA procedure by a UE, the UE may transmit a pilot sequence in a fourth portion 370 of the S subframe 330, such as an uplink CUBS (U-CUBS) to provide an indication to other UEs or apparatuses (e.g., base stations, Wi-Fi access points, etc.) that the UE has reserved the channel. In some examples, a U-CUBS may be transmitted using a plurality of interleaved resource blocks. Transmitting a U-CUBS in this manner may enable the U-CUBS to occupy at least a certain percentage of the available frequency bandwidth of the shared radio frequency spectrum band and satisfy one or more regulatory requirements (e.g., the requirement that transmissions over the shared radio frequency spectrum band occupy at least 80% of the available frequency bandwidth). The U-CUBS may in some examples take a form similar to that of an LTE/LTE-A CRS or CSI-RS. When the UCCA procedure fails, the U-CUBS may optionally not be transmitted.

The S subframe 330 may include a plurality of OFDM symbol periods (e.g., 14 OFDM symbol periods). A first portion 355 of the S subframe 330 may be used by a number of base stations as a shortened downlink (D) period. The second portion 360 of the S subframe 330 may be used as a guard period (GP). The third portion 365 of the S subframe 330 may be used for the UCCA procedure. The fourth portion 370 of the S subframe 330 may be used by one or more UEs that successfully contend for access to the channel of the shared radio frequency spectrum band as an uplink pilot time slot (UpPTS) or to transmit the U-CUBS. For transmissions having a normal CP or an extended CP, possible UpPTS lengths include 1 or 2 symbol periods.

The transport block size (TBS) for the shortened D period, as shown in the first portion 355 of the S subframe 330, may be scaled downward by a factor. For example, the TBS scaling factor may be 0.375 for a DwPTS length of 6 (e.g., a transmission having a normal CP) or 5 (e.g., a transmission having an extended CP). If the DwPTS length is 3, a PDSCH or EPDCCH may not be transmitted. The TBS scaling factor may be 0.75 for other special subframe configurations.

In some examples, the DCCA procedure or the UCCA procedure may include the performance of a single CCA procedure. In other examples, the DCCA procedure or the UCCA procedure may include the performance of an extended CCA procedure. The extended CCA procedure may include a random number of CCA procedures, and in some examples may include a plurality of CCA procedures. The terms DCCA procedure and UCCA procedure are therefore intended to be broad enough to cover the performance of either a single CCA procedure or an extended CCA procedure. The selection of a single CCA procedure or an extended CCA procedure, for performance by a base station or a UE during an LBT radio frame, may be based on LBT rules. In some cases, the term CCA procedure may be used in this disclosure, in a general sense, to refer to either a single CCA procedure or an extended CCA procedure.

By way of example, the LBT radio frame 315 has a DDDDDDSUUS' TDD frame structure. In other examples, an LBT radio frame may have a different TDD frame structure. For example, an LBT radio frame may have one of the TDD frame structures used in enhanced interference mitigation and traffic adaptation (eIMTA).

Figure 4A:
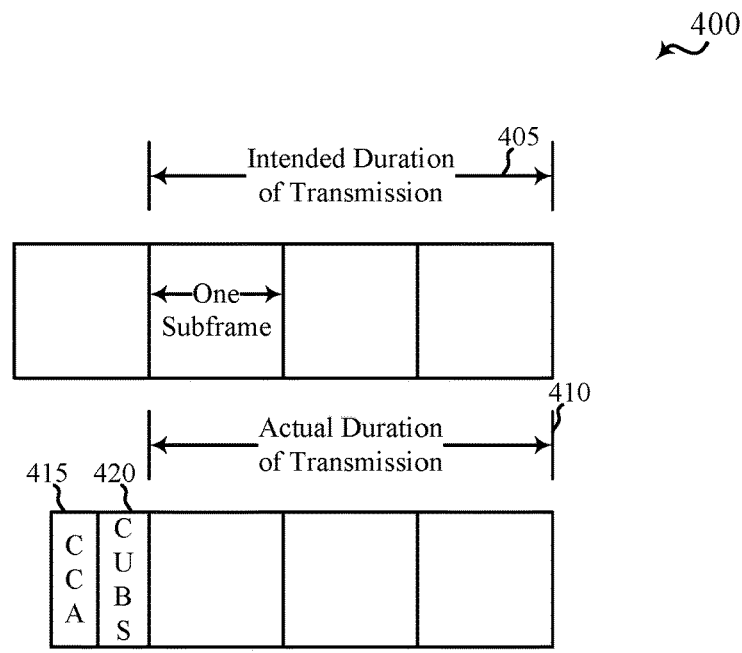
FIG. 4A illustrates an example of a CCA procedure performed by a transmitting apparatus when contending for access to a shared radio frequency spectrum band, in accordance with aspects of the present disclosure.

FIG. 4A illustrates an example 400 of a CCA procedure 415 performed by a transmitting apparatus when contending for access to a shared radio frequency spectrum band, in accordance with aspects of the present disclosure. In some examples, the CCA procedure 415 may be an example of the DCCA procedure or UCCA procedure described with reference to FIG. 3. The CCA procedure 415 may have a fixed duration. In some examples, the CCA procedure 415 may be performed in accordance with an LBT-frame based equipment (LBT-FBE) protocol (e.g., the LBT-FBE protocol described by EN 301 893). Following the CCA procedure 415, a CUBS 420 may be transmitted, followed by a data transmission (e.g., an uplink transmission or a downlink transmission). By way of example, the data transmission may have an intended duration 405 of three subframes and an actual duration 410 of three subframes.

Figure 4B:
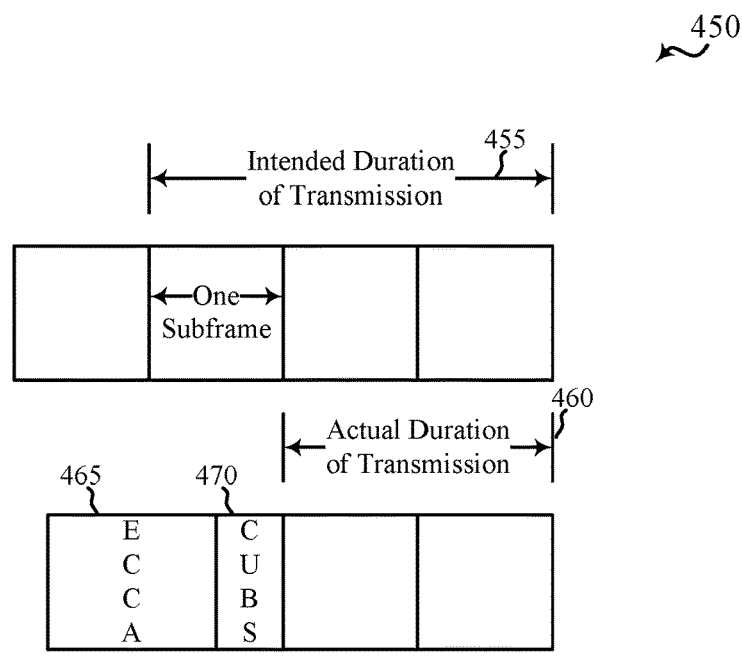
FIG. 4B illustrates an example of an extended CCA (eCCA) procedure performed by a transmitting apparatus when contending for access to a shared radio frequency spectrum band, in accordance with aspects of the present disclosure.

FIG. 4B illustrates an example 450 of an extended CCA (eCCA) procedure 465 performed by a transmitting apparatus when contending for access to a shared radio frequency spectrum band, in accordance with various aspects of the present disclosure. In some examples, the eCCA procedure 465 may be an example of the DCCA procedure or UCCA procedure described with reference to FIG. 3. The eCCA procedure 465 may include a random number of CCA procedures, and in some examples may include a plurality of CCA procedures. The eCCA procedure 465 may therefore have a variable duration. In some examples, the eCCA procedure 465 may be performed in accordance with an LBT-load based equipment (LBT-LBE) protocol (e.g., the LBT-LBE protocol described by EN 301 893). The eCCA procedure 465 may provide a greater likelihood of winning contention to access the unlicensed radio frequency spectrum band, but at a potential cost of a shorter data transmission. Following the eCCA procedure 465, a pilot sequence such as CUBS 470 may be transmitted, followed by a data transmission. By way of example, the data transmission may have an intended duration 455 of three subframes and an actual duration 460 of two subframes.

In some examples, a starting symbol of a transmission made after winning contention for access to a shared radio frequency spectrum band may always be transmitted during a first symbol period of a next full subframe, and one or more channel reservation signals (e.g., CUBS or fractional CUBS) may be transmitted until the subframe boundary preceding the next full subframe. In other examples, a starting symbol of a transmission made after winning contention for access to the shared radio frequency spectrum band may be transmitted during an earlier symbol period (e.g., a symbol period of the subframe in which contention for access to the shared radio frequency spectrum band is won), which may increase transmission efficiency.

Figure 5A:
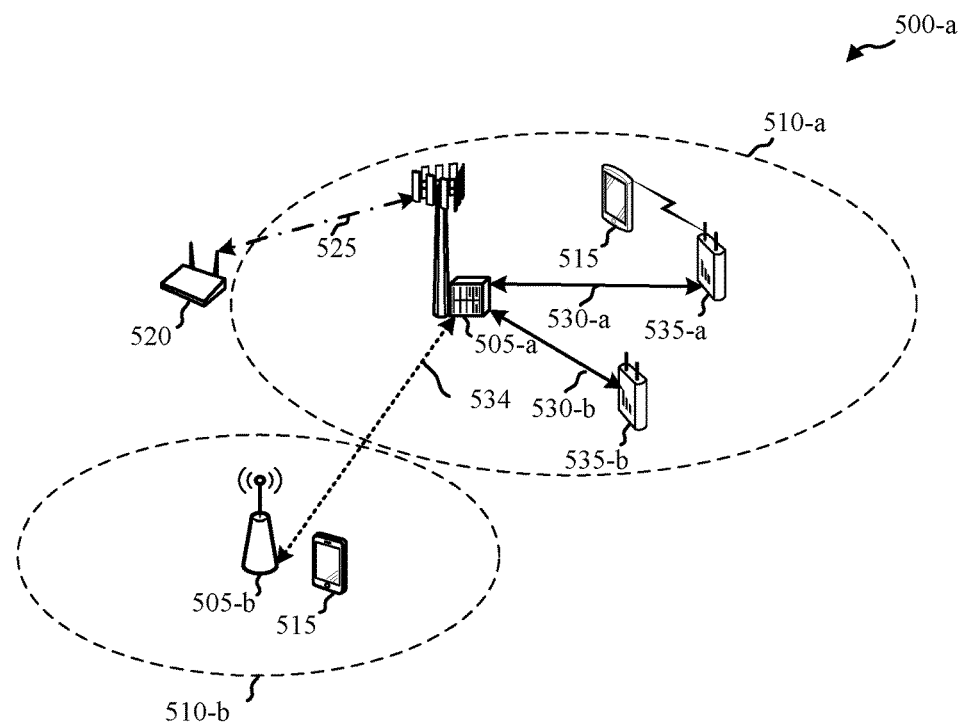
FIG. 5A illustrates an example of a wireless communications system in which one or more wireless devices may experience interference from another device in a shared radio frequency spectrum band, in accordance with aspects of the present disclosure.

FIG. 5A, illustrates an example of a wireless communication system 500-a in which one or more wireless devices, such as base stations or other network nodes, may experience interference from another device in a shared radio frequency spectrum band, in accordance with aspects of the present disclosure. Wireless communication system 500-a may illustrate, for example, aspects of wireless communication systems 100 or 200 illustrated in FIG. 1 or 2. In this example, wireless communication system 500-a may include one or more base stations 505, one or more UEs 515, and a separate device, such as a Wi-Fi access point 520, that each operate using a shared radio frequency spectrum band. In the example of FIG. 5A, distributed antenna(s) 535 may be present that are associated with serving base station 505-a, which base station 505-a may utilize for transmissions, and which, in various examples, may not have independent processing capability. The base stations 505 may be examples of aspects of one or more of the base stations 105 or 205 described with reference to FIG. 1 or 2, while UEs 515 may be examples of aspects of one or more of the UEs 115 or 215 described with reference to FIG. 1 or 2. Base stations 505 may communicate with each other over backhaul link 534 (e.g., X2, etc.), which may be an example of backhaul links 134 described with reference to FIG. 1, and may be wired or wireless communication links.

As illustrated in the example of FIG. 5A, wireless communication system 500-a includes cells 510-a and 510-b. Cell 510-a may include base stations 505-a and distributed antenna(s) 535-a and 535-b, and an adjacent cell 510-b may include base station 505-b. While two base stations 505 are illustrated, it will be readily understood that any number of different base stations 505 may be present. Similarly, although two distributed antenna(s) 535 are illustrated as being associated with cell 510-a and serving base station 505-a, it will be readily recognized that more or fewer distributed antennas may be present in a cell 510. As mentioned above, various different devices may transmit using a shared radio frequency spectrum band, and may be present in wireless communication system 500.

In some examples, such as wireless communication system 500-a, a Wi-Fi access point 520 may be located near base station 505-a, which may be within or adjacent to the geographic boundary of cell 510-a. As shown in wireless communication system 500-a, a Wi-Fi access point 520 may transmit an interfering signal 525, which may impose an interference at the base station 505-a of a strength such that an access procedure (e.g., CCA procedure) by the base station 505-a for access to a shared radio frequency spectrum band may be unsuccessful (e.g., the interference may prevent base station 505-a from winning contention for access on the shared radio frequency spectrum band). For example, base station 505-a may have antennas physically co-located at base station 505-a at a location that may receive transmissions from Wi-Fi access point 520 with a signal strength sufficient to result in a failed access procedure. However, distributed antenna(s) 535-a and 535-b, which may be, for example, remote radio heads (RRHs) may also be associated with base station 505-a, and may subsequently be associated with cell 510-a. In some examples, distributed antenna(s) 535-a and 535-b may be located at a sufficient distance from the Wi-Fi access point 520 that the signal strength of interfering signal 525 may be lower than at physically co-located antennas of the base station 505-a. In some examples, interference at the distributed antennas may be low enough that the base station 505-a may perform a successful access procedure using one or both of the distributed antenna(s) 535-a or 535-b (e.g., winning contention to a shared radio frequency spectrum band when employing antenna(s) 535-a and/or 525-b) to subsequently access to the shared radio frequency spectrum band by way of one or both of the distributed antenna(s) 535-a or 535-b.

According to various aspects of the present disclosure, base station 505-a may individually control antennas physically co-located at the base station 505-a location and each of the non-co-located distributed antenna(s) 535-a and 535-b (e.g., via control links 530-a and 530-b) to perform an access procedure. If antennas at one or more locations (distributed antenna(s) 535-b and 535-b in this example) are employed in a successful contention procedure for the shared radio frequency spectrum band and one or more antennas at other locations (antennas co-located at base station 505-a location in this example) are employed in an unsuccessful contention procedure for the shared radio frequency spectrum band, subsequent transmissions on the shared radio frequency spectrum band may be made using the antennas associated with the successful contention procedure. In such a manner, channel access may be enhanced for the base station 505-a and at least a subset of the UEs 515 served by the base station 505-a (e.g., at least a subset of UEs 515 within the cell 510-a).

Each base station 505 may include one or more different antennas, or groups of antennas, and in some examples, a first base station, such as base station 505-a, may perform a first access procedure (e.g., CCA or eCCA) to contend for access to the shared radio frequency spectrum band during a time period using a first subset of antennas associated with the base station 505-a, such as using antennas physically co-located at the base station 505-a site. The base station 505-a may perform a second access procedure (e.g., CCA or eCCA) to contend for access to the shared radio frequency spectrum band during the time period using a second subset of antennas associated with the base station 505-a, different from the first subset, such as using distributed antenna(s) 535-a. Similarly, base station 505-a may perform a third access procedure to contend for access using distributed antenna(s) 535-b. In some examples, one or more antennas co-located with base station 505-a, and/or one or more antennas of distributed antenna(s) 535-a and 535-b, may be included in a logical antenna port that may be used to transmit various reference and control signals, such as a common reference signal (CRS). The logical antenna port may include, for example, antennas of base station 505-a that may be geographically non-co-located.

Based on the access procedures, it may be identified that the first subset of antennas associated with a base station can access the shared radio frequency spectrum band (e.g., were employed in a successful access procedure for the shared radio frequency spectrum band), and the shared radio frequency spectrum band may be accessed using the first subset of antennas associated with the base station. As discussed above, when a base station 505 wins contention to the shared radio frequency spectrum band, a preamble, such as a CUBS or Wi-Fi preamble, may be transmitted indicating a successful access procedure, and may, for example, be transmitted by one or more of the antennas of the first subset of antennas associated with the base station. In some examples, the preamble may include a common pilot signal associated with a logical antenna port of the base station 505-a. In some examples, even though the logical antenna port may include one or more antennas associated with a base station 505 (e.g., antennas co-located with base station 505-a in the example of FIG. 5A) that did not gain channel access, the common pilot signal may continue to be transmitted, using less than all of the antennas associated with the logical antenna port. In this example, the common pilot signal may be transmitted from the first subset of antennas. In some examples, the common preamble may also include an identifier that indicates which antennas are transmitting the common pilot signal. In other examples, the preamble may include one or more antenna-specific pilot signals, such as a channel state information reference signal (CSI-RS) that are each associated with one or more antennas that won contention for the shared radio frequency spectrum band. In such cases, the preamble would be transmitted from those logical antenna ports that were employed in the successful access procedure. In still further examples, the preamble may include one or more dedicated pilot signals, such as a UE reference signal (UE-RS) associated with a receiver, such as a UE 515. Such dedicated pilot signals may be transmitted using logical antenna ports to each of which one or more physical antennas are mapped using precoding.

While base stations 505-a and 505-b are illustrated as each having a respective cell in FIG. 5A (e.g., cells 510-a and 510-b, respectively), it may be recognized that a base station 505 may serve more than one cell (e.g., more than one geographic area). In such examples, each cell of a base station 505 may be associated with more than one antenna, and the described access procedures may be performed for the cell of the base station 505 on a per-antenna (or group of antennas) basis. In other words, a base station 505 may perform an access procedure for a particular cell of the base station 505 to access a shared radio frequency spectrum band, where the access procedure is performed for more than one subset of antennas of the cell. The base station 505 may select from those antennas that were employed in a successful access procedure to perform subsequent communications using the shared radio frequency spectrum band, while other antennas associated with the cell of the base station 505 remain idle or are otherwise employed for communications using a different radio frequency spectrum band.

While base stations 505-a and 505-b are illustrated as each having a respective cell in FIG. 5A (e.g., cells 510-a and 510-b, respectively), it may be recognized that more base stations may be present in a cell, and that different base stations 505 may include one or more groups of antennas. In some examples, two or more subsets of antennas associated with a base station 505 may gain access to the shared radio frequency spectrum band for a time period (e.g., were employed in a successful access procedure), and the shared radio frequency spectrum band may be accessed using two or more of such subsets of antennas. In some examples, each subset of antennas may transmit a preamble indicating a successful access procedure using frequency division multiplexing (FDM) between the different subsets of antennas. In some examples, the preamble may include a plurality of symbols, and different preamble symbols may be transmitted from different subsets of antennas. In some examples, certain of such preamble symbols may be common among the different subsets of antennas, and other symbols may be unique to a particular subset of antennas. For example, a last preamble symbol may use the same sequence across different subsets of antennas, which may be useful, for example, to provide phase reference for demodulation of certain control information (e.g., physical frame format indicator channel (PFFICH)).

As discussed above, if a base station does not perform a successful access procedure (e.g., does not win contention, or otherwise performs a contention procedure that is unsuccessful) for transmissions on a shared radio frequency spectrum employing a subset of antennas associated with the base station, in some examples that particular subset of antennas will not transmit during a transmission period associated with the contention procedure. In some examples, that subset of antennas may transmit signals during the transmission period in a radio frequency band that is not associated with the unsuccessful contention procedure. A base station may attempt to perform a subsequent access procedure employing that subset of antennas to gain access to the shared radio frequency spectrum band. In some examples, such an access procedure may be performed while the one or more subsets of antennas of the base station is transmitting.

Figure 5B:
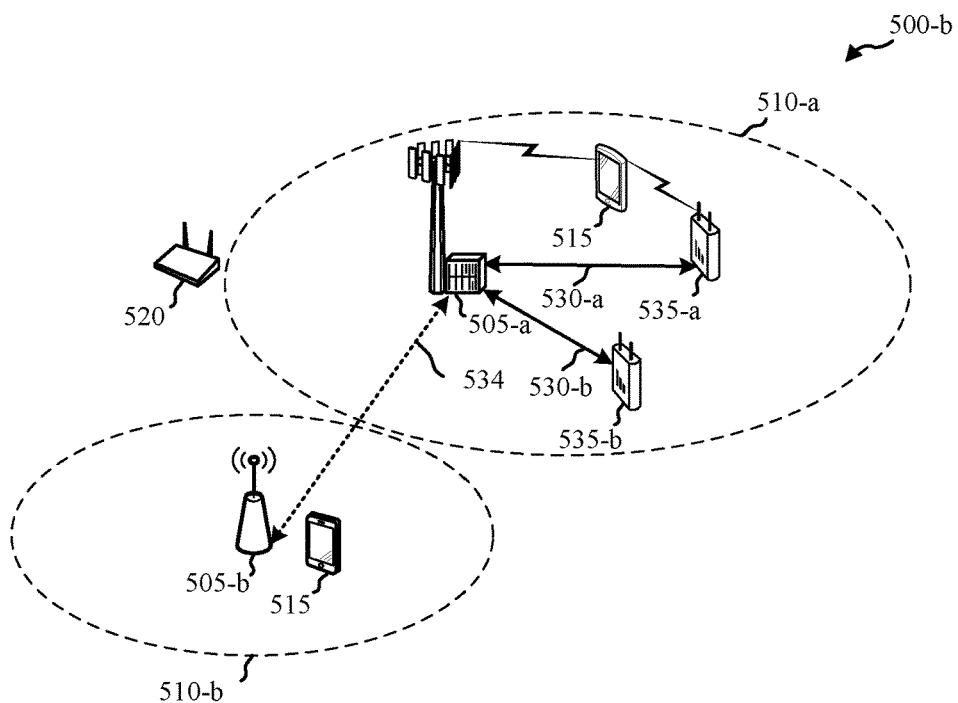
FIG. 5B illustrates an example of a wireless communications system in which one or more subsets of antennas may begin transmitting following successful channel access by another subset of antennas, in accordance with aspects of the present disclosure.

FIG. 5B illustrates an example of a wireless communication system 500-b in which one or more subsets of antennas may begin transmitting following successful channel access by another subset of antennas, in accordance with aspects of the present disclosure. Wireless communication system 500-b may illustrate, for example, aspects of wireless communication systems 100, 200, or 500-a illustrated in FIG. 1, 2, or 5A. In this example, wireless communication system 500-b may include one or more base stations 505, one or more UEs 515, and a separate device, such as a Wi-Fi access point 520, that each operate using the shared radio frequency spectrum band. Distributed antenna(s) 535 also may be present and may be associated with base station 505-a. The base stations 505 may be examples of aspects of one or more of the base stations 105, 205, or 505 described with reference to FIG. 1, 2, or 5, while UEs 515 may be examples of aspects of one or more of the UEs 115, 215, or 515 described with reference to FIG. 1, 2, or 5. Base stations 505 may communicate with each other over backhaul link 534 (e.g., X2, etc.), which may be an example of backhaul links 134 described with reference to FIG. 1, and may be wired or wireless communication links.

In the example of FIG. 5B, distributed antenna(s) 535-a may be employed to perform a successful CCA over a shared radio frequency spectrum band, and perform subsequent transmissions over the shared radio frequency spectrum band. Due to interference caused by a Wi-Fi access point 520, antennas co-located at the base station 505-a may be associated with an unsuccessful CCA, and therefore may not be employed in the subsequent transmissions. Subsequently, Wi-Fi access point 520 may discontinue transmitting using the shared radio frequency spectrum band (e.g., may be idle). Base station 505-a may then perform a subsequent access procedure, gain access to the channel, and begin transmission employing antennas co-located at the base station 505-a and distributed antenna(s) 535-a. For the subsequent access procedure, the antennas co-located with the base station 505-a may perform an interference cancellation procedure for signals from distributed antenna(s) 535-a.

In some examples, antenna(s) 535-a may perform downlink power control which may result in, for example, transmissions from antenna(s) 535-a to be transmitted at a lower power. The downlink power control may help antennas co-located with base station 505-a to gain channel access without needing interference cancellation of signals from antenna(s) 535-a. If base station 505-a determines that no other transmitters are occupying the shared radio frequency spectrum band, the base station 505-a may utilize antennas co-located with base station 505-a join the transmissions of distributed antenna(s) 535-a. In some examples, the first base station 505-a may determine that the distributed antenna(s) 535-a are transmitting a preamble sequence, and may join in the transmission of the preamble sequence. In other examples, the first base station 505-a may determine that the distributed antenna(s) 535-a are transmitting data, and may begin immediately transmitting data upon gaining channel access.

In some examples, distributed antenna(s) 535-a or 535-b may perform an asynchronous access procedure (e.g., asynchronous eCCA) with antennas co-located with base station 505-a. In some other examples, distributed antenna(s) 535-a or 535-b may choose to perform a synchronized access procedure (e.g., synchronized eCCA) with antennas co-located with base station 505-a. Information related to frame boundaries and related synchronization are available as the two sets of antennas belongs to the same cell. An adjacent base station 505-b associated with an adjacent cell 510-b may operate in a similar manner as base station 505-a.

Although the wireless communication systems 500-a and 500-b described with reference to FIGS. 5A and 5B describe base stations 505 as having a plurality of associated antennas 535, and performing access procedures employing subsets of associated antennas 535, the described methods may be performed by any device having a plurality of antennas when contending for access to a shared radio frequency spectrum band. For instance, a UE may have a plurality of antennas associated with the UE, either co-located at the device, or geographically distributed. For instance, in some examples a UE 515 may have multiple co-located antennas, and/or may have access to a plurality of antennas by way of an antenna extension, an external antenna, a docking station, or any other suitable means. Those UEs having a plurality of associated antennas may perform access procedures for accessing a shared radio frequency spectrum band by employing a subset of antennas, and select from those antennas associated with a successful contention procedure for subsequent transmissions, while other antennas of the UE 515 may remain idle, or used for transmissions on another radio frequency spectrum band.

Figure 6A:
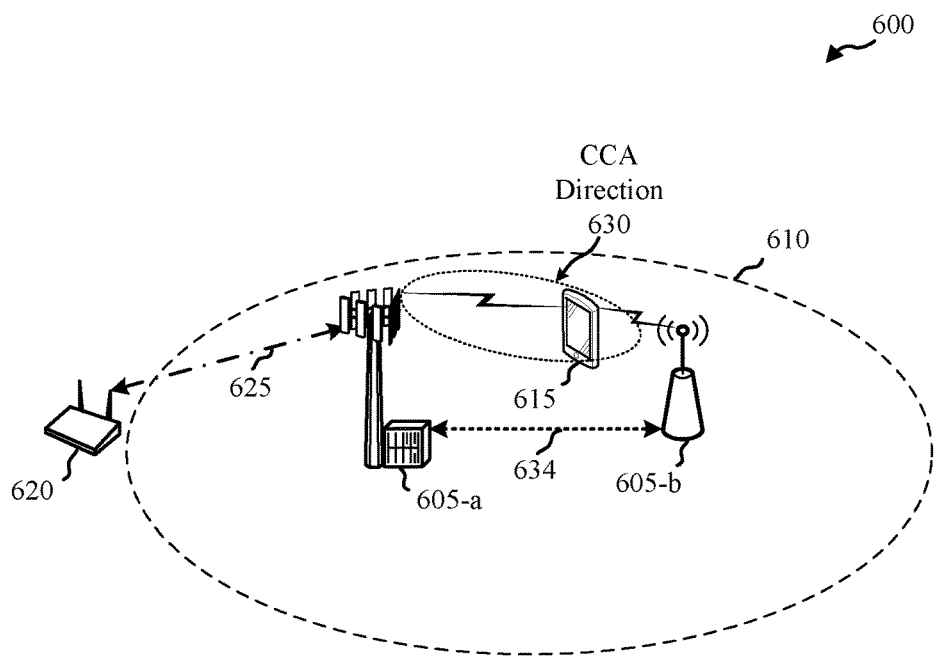
FIG. 6A illustrates an example of a wireless communications system in which one or more wireless devices may experience interference from another device in a shared radio frequency spectrum band, in accordance with aspects of the present disclosure.

FIG. 6A, illustrates an example of a wireless communication system 600 in which one or more wireless devices, such as a base station, a UE, or other network node, may experience interference from another device in a shared radio frequency spectrum band, in accordance with aspects of the present disclosure. Wireless communication system 600 may illustrate, for example, aspects of wireless communication systems 100, 200, or 500 illustrated in FIG. 1, 2, 5A, or 5B. In this example, wireless communication system 600 may include one or more base stations 605, one or more UEs 615, and a separate device, such as a Wi-Fi access point 620, that each operate using the shared radio frequency spectrum band. The base stations 605 may be examples of aspects of one or more of the base stations 105, 205, or 505 described with reference to FIG. 1, 2, 5A, or 5B, and UEs 615 may be examples of aspects of one or more of the UEs 115, 215, or 515 described with reference to FIG. 1, 2, 5A, or 5B. Base stations 605 may communicate with each other over backhaul links 634 (e.g., X2, etc.), which may be examples of backhaul links 134 described with reference to FIG. 1, and may be wired or wireless communication links.

As illustrated in the example of FIG. 6A, wireless communication system 600 includes cell 610, which may include base stations 605-*a* and 605-*b*. Similarly as above, various different devices may transmit using the shared radio frequency spectrum band, and may be present in wireless communication system 600. In this example, a Wi-Fi access point 620 may be located nearby one or both of base stations 605-*a* or 605-*b*, such as within or adjacent to the geographic boundary of cell 610. In this example, Wi-Fi access point 620 may transmit an interfering signal 625, which may impose an interference at the base station 605-*a* of a strength such that an access procedure (e.g., CCA procedure) by the base station 605-*a* for access to a shared radio frequency spectrum band may be unsuccessful (e.g., the interference may prevent base station 605-*a* from winning contention for access on the shared radio frequency spectrum band). However, the interference from Wi-Fi access point 620 may be concentrated in a certain direction that may be different than a spatial direction of a UE 615 with which base station 605-*a* is to communicate. In certain examples, beamforming may be employed by the base station 605-*a* to perform directional CCA. Directional CCA recognizes that, whether antennas of serving base station are co-located or not, CCA need not be performed isotropically, and the channel needs to be clear only in the direction of intended transmission. Thus, in examples, base station 605-*a* may perform a directional CCA in the intended direction of transmission 630.

In some examples, directional CCA may obtain interference information on two or more different spatial directions relative to the base station 605-*a*. For example, base station 605-*a* may perform an interference measurement for each precoder in a pre-agreed codebook, and determine that interference is present in one or more spatial directions and that the channel may be clear in one or more other spatial directions. In some examples, this information may be shared across antennas and/or base stations (e.g., with base station 605-*b*) and can be used to assist in enhancing a choice of precoder matrix to be used for different transmissions. In some examples, a base station 605-*a* may select different users for transmissions, such as based on precoding vectors winning channel access procedures. Additionally, directional CCA may be used in conjunction with per-antenna CCA (e.g., an access procedure employing a subset of antennas associated with a base station) such as described above with respect to FIGS. 5A and 5B, and the precoding matrix used for actual data transmission may be re-optimized based on the subset of antennas that have been employed in successful channel access procedures. In some examples, the access procedure may include measuring an energy level or detecting a known sequence at two or more antennas according to a precoding procedure associated with the respective spatial direction. In some examples, the energy level or detected sequence strength may be provided to one or more other transmitters in the wireless communications system 600, such as other UEs and/or base stations.

As discussed above, base station 605-*a* may transmit a preamble upon gaining channel access (e.g., following a successful access procedure). In some examples, when using a directional access procedure (e.g., an access procedure directed along one or more directions by way of beamforming at an antenna array), the preamble may include one or more dedicated pilot signals, such as a UE reference signal (UE-RS) associated with a receiver, such as a UE 615. Such dedicated pilot signals may be transmitted using logical antenna ports to each of which one or more physical antennas are mapped using precoding. Thus, once the base station 605-*a* gains access to the shared radio frequency spectrum band using a directional CCA, it may transmit the preamble from the dedicated pilot using precoding so that both the preamble and data are transmitted along the direction associated with the successful access procedure. In some situations, if a preamble were to be transmitted using a common pilot, the preamble transmission could potentially give interference to the Wi-Fi access point 620.

Figure 6B:
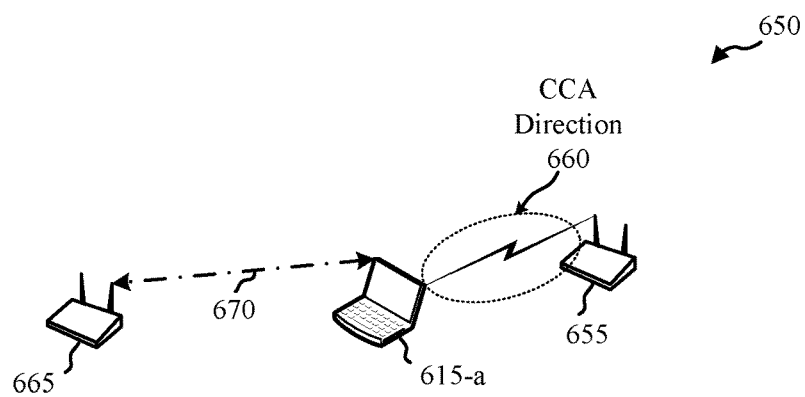
FIG. 6B illustrates an example of a wireless communications system in which one or more wireless devices may perform a directional access procedure in a shared radio frequency spectrum band, in accordance with aspects of the present disclosure.

FIG. 6B illustrates an example of a wireless communication system 650 in which one or more wireless devices, such as a UE, may perform a directional access procedure in a shared radio frequency spectrum band, in accordance with aspects of the present disclosure. Wireless communication system 650 may illustrate, for example, aspects of a Wi-Fi system, and may include a serving access point 655, an interfering access point 665 transmitting an interfering signal 670, and one or more UEs 615-*a*, that each operate using the shared radio frequency spectrum band. In the example of FIG. 6B, UE 615-*a* may use a directional access procedure, similar to the directional access procedure of base station 605-*a* described above. In some examples, the UE 615-*a* may obtain interference information along two or more different spatial directions relative to the UE 615-*a*. For example, UE 615-*a* may perform an interference measurement for each precoder in a pre-agreed codebook, and determine that interference is present along one or more spatial directions and thus that the channel may be clear in one or more other spatial directions. In some examples, the access procedure may include measuring an energy level or detecting a known sequence at two or more antennas according to a precoding procedure associated with the respective spatial direction. In some examples, the energy level or detected sequence strength may be provided to one or more other nodes (base stations and/or UEs).

Similarly as discussed above relative to base station 605-*a*, UE 615-*a* may transmit a directional preamble upon gaining channel access (e.g., following a successful directional access procedure), to avoid interference with interfering access point 665. In some examples, this may include a selection of a precoding matrix for transmissions over the shared radio frequency spectrum band based in part in the direction determined to be available during the performed access procedure. Thus, once UE 615-a gains access to the shared radio frequency spectrum band using a directional access procedure, it may transmit the preamble from the dedicated pilot using precoding so that both the preamble and data are transmitted along the available direction (e.g., CCA direction 660).

In various examples, the methods described for access procedures employing a subset of antennas and methods described for directional access procedures may be combined. For example, a UE 615 may perform a directional access procedure for access to the shared radio frequency spectrum band using at a first subset of antennas and a second subset of antennas different than the first subset of antennas. In some examples the UE 615 may identify that a first subset of antennas can access the shared radio frequency spectrum band in an available direction based the directional access procedure, and perform subsequent communications by employing beamforming at one or more of the antennas of the first subset of antennas.

Figure 7:
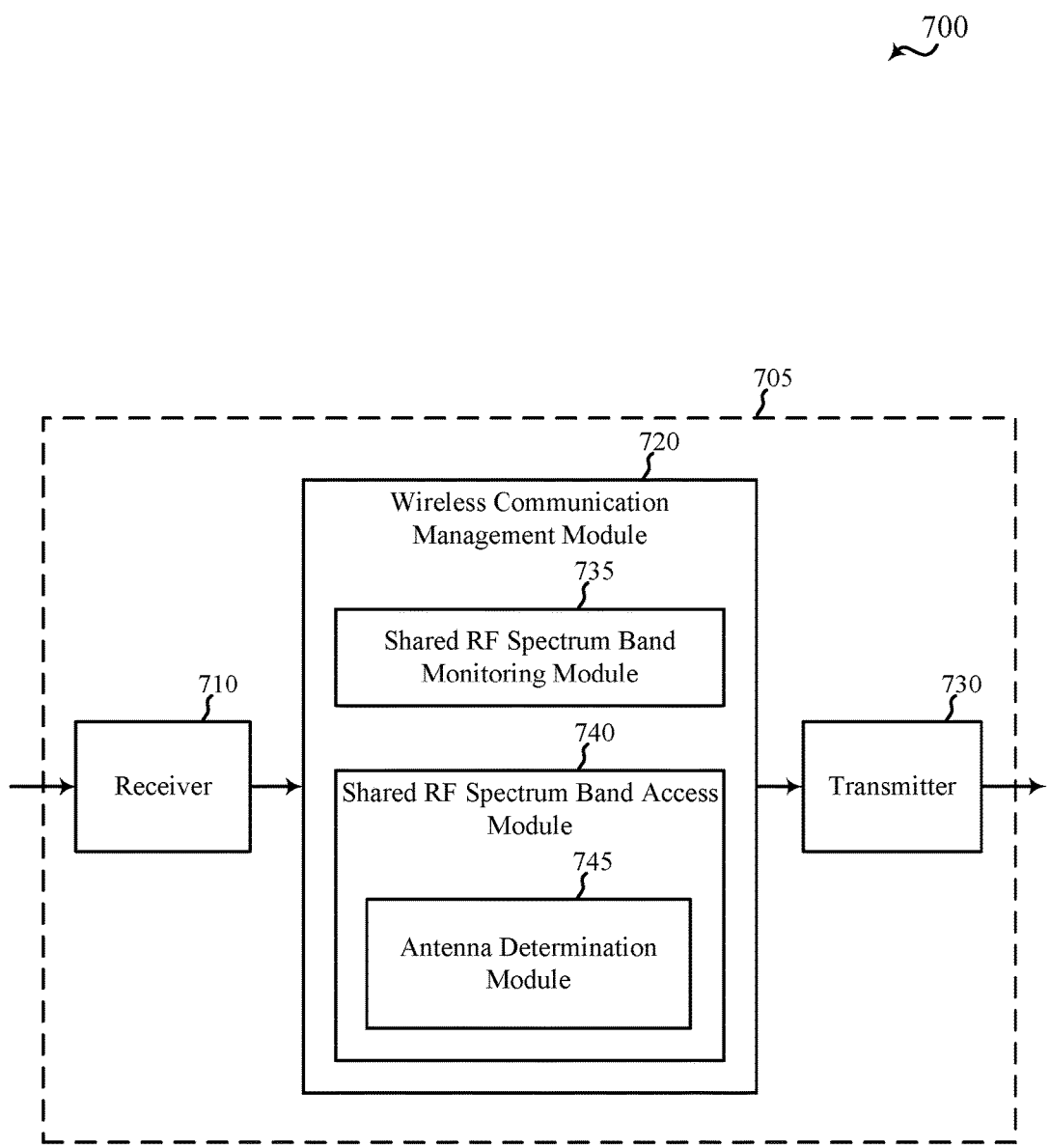
FIG. 7 illustrates a block diagram of an apparatus configured for use in wireless communication, in accordance with aspects of the present disclosure.

FIG. 7 illustrates a block diagram 700 of an apparatus 705 configured for use in wireless communication, in accordance with aspects of the present disclosure. In some examples, apparatus 705 may be an example of aspects of one or more of the base stations 105, 205, 505, or 605 described with reference to FIG. 1, 2, 5A, 5B, or 6A, or access points 655 or 665 of FIG. 6B. In some examples, apparatus 705 may be an example of aspects of one or more of the UEs 115, 215, 515, or 615 described with reference to FIG. 1, 2, 5A, 5B, 6A, or 6B. The apparatus 705 may also be or include a processor. The apparatus 705 may include a receiver 710, a wireless communication management module 720, or a transmitter 730. Each of these modules may be in communication with each other.

The modules of the apparatus 705 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., a Structured/Platform ASIC, a Field Programmable Gate Array (FPGA), and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver 710 may include at least one radio frequency (RF) receiver, such as at least one RF receiver operable to receive transmissions over a dedicated radio frequency spectrum band and/or a shared radio frequency spectrum band. The dedicated radio frequency spectrum band may include a radio frequency spectrum band for which transmitting apparatuses may not be required to contend for access (e.g., a radio frequency spectrum band licensed to particular users for particular uses, such as a licensed radio frequency spectrum band usable for LTE/LTE-A communications). The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner). In various examples, the dedicated radio frequency spectrum band and/or the shared radio frequency spectrum band may be used for LTE/LTE-A communications, as described, for example, with reference to FIG. 1 or 2. The receiver 710 may be used to receive various types of data or control signals (i.e., transmissions) over one or more communication links of a wireless communication system, such as one or more communication links of the wireless communication systems 100, 200, 500, 600, or 650 described with reference to FIG. 1, 2, 5A, 5B, 6A, or 6B. The communication links may be established over one or more of a dedicated radio frequency spectrum band or a shared radio frequency spectrum band.

In some examples, the transmitter 730 may include at least one RF transmitter, such as at least one RF transmitter operable to transmit over a dedicated radio frequency spectrum band and/or a shared radio frequency spectrum band. The transmitter 730 may be used to transmit various types of data or control signals (i.e., transmissions) over one or more communication links of a wireless communication system, such as one or more communication links of the wireless communication system 100, 200, 500, 600, or 650 described with reference to FIG. 1, 2, 5A, 5B, 6A, or 6B. The communication links may be established over one or more of a dedicated radio frequency spectrum band or a shared radio frequency spectrum band.

In some examples, the wireless communication management module 720 may be used to manage one or more aspects of wireless communication for the apparatus 705. In various examples, the wireless communication management module 720 may include a shared RF spectrum band monitoring module 735 or a shared RF spectrum band access module 740.

In some examples, the shared RF spectrum band monitoring module 735 may be used to monitor at least one predetermined symbol period of a subframe for an indication that another wireless device (e.g., a base station or other wireless transmitter) has obtained access to the shared radio frequency spectrum band (e.g., indication that a successful access procedure was performed).

The shared RF spectrum band access module 740 may determine that the shared radio frequency spectrum band is available or unavailable for transmissions, and may include an antenna determination module 745 that may determine one or more subsets of antennas associated with the apparatus 705 that may have cleared an access procedure for accessing the shared radio frequency spectrum band (e.g., one or more subset of antennas that have been employed in a successful access procedure).

Figure 8:
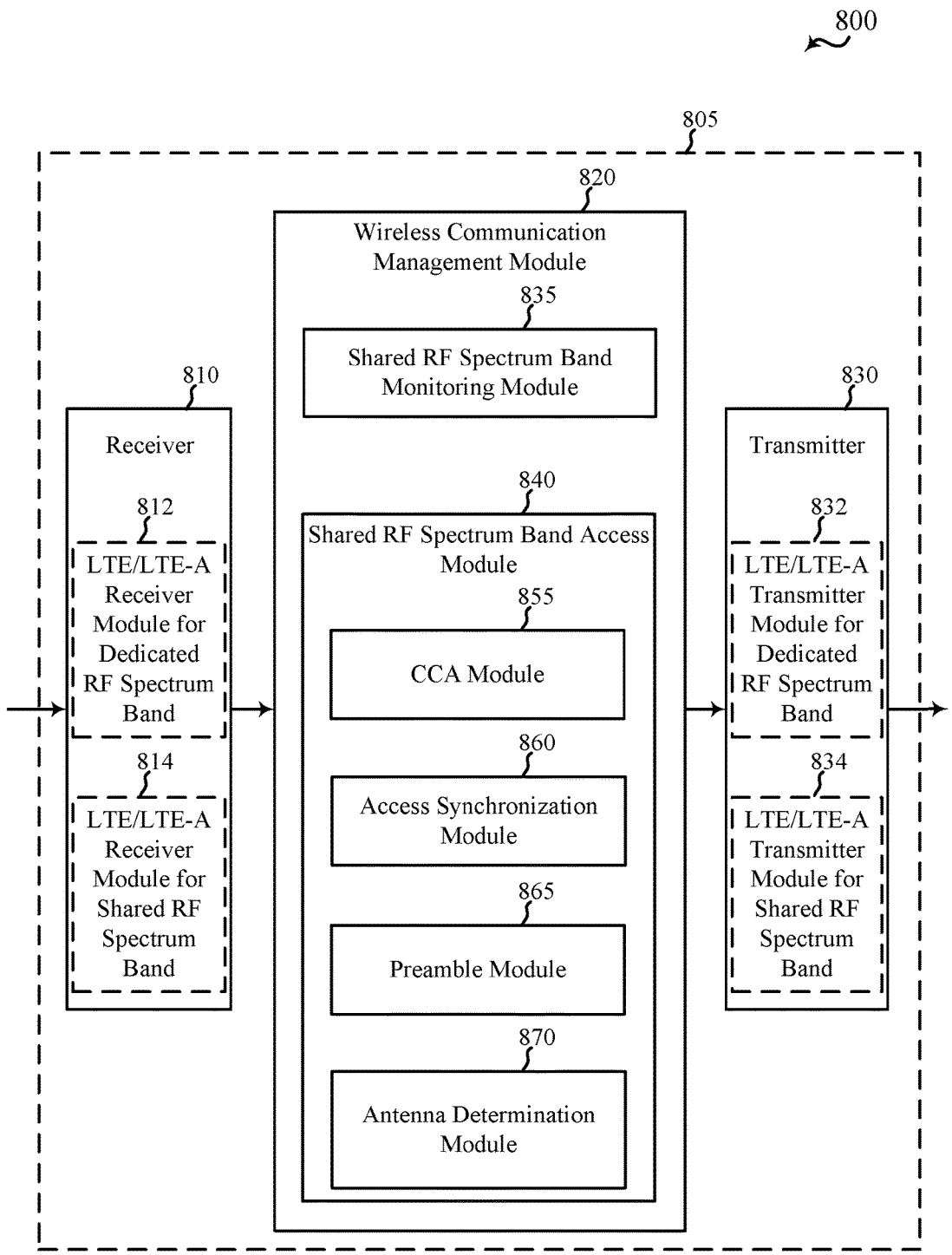
FIG. 8 illustrates a block diagram of an apparatus configured for use in wireless communication, in accordance with aspects of the present disclosure.

FIG. 8 illustrates a block diagram 800 of an apparatus 805 for use in wireless communication, in accordance with aspects of the present disclosure. The apparatus 805 may be an example of aspects of one or more of the base stations 105, 205, 505, or 605 described with reference to FIG. 1, 2, 5A, 5B, or 6A, access points 655 or 665 described with reference to FIG. 6B. In some examples, apparatus 805 may be an example of aspects of one or more of the UEs 115, 215, 515, or 615 described with reference to FIG. 1, 2, 5A, 5B, 6A, or 6B. In some examples, apparatus 805 may be an example of one or more aspects of apparatus 705 described with reference to FIG. 7. The apparatus 805 may also be or include a processor. The apparatus 805 may include a receiver 810, a wireless communication management module 820, or a transmitter 830. Each of these modules may be in communication with each other.

The modules of the apparatus 805 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver 810 may include at least one RF receiver, such as at least one RF receiver operable to receive transmissions over a dedicated radio frequency spectrum band and/or a shared radio frequency spectrum band. The dedicated radio frequency spectrum band may include a radio frequency spectrum band for which transmitting apparatuses may not be required to contend for access (e.g., a radio frequency spectrum band licensed for particular users for particular uses, such as a licensed radio frequency spectrum band usable for LTE/LTE-A communications). The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner). In various examples, the dedicated radio frequency spectrum band or the shared radio frequency spectrum band may be used for LTE/LTE-A communications, as described, for example, with reference to FIG. 1 or 2. The receiver 810 may in some cases include separate receivers for a dedicated radio frequency spectrum band and a shared radio frequency spectrum band. The separate receivers may, in some examples, take the form of an LTE/LTE-A receiver module for communicating over the dedicated radio frequency spectrum band (e.g., LTE/LTE-A receiver module for dedicated RF spectrum band 812), and an LTE/LTE-A receiver module for communicating over the shared radio frequency spectrum band (e.g., LTE/LTE-A receiver module for shared RF spectrum band 814). The receiver 810, including the LTE/LTE-A receiver module for dedicated RF spectrum band 812 or the LTE/LTE-A receiver module for shared RF spectrum band 814, may be used to receive various types of data or control signals (i.e., transmissions) over one or more communication links of a wireless communication system, such as one or more communication links of the wireless communication system 100 or 200 described with reference to FIG. 1 or 2. The communication links may be established over one or more of a dedicated radio frequency spectrum band or a shared radio frequency spectrum band.

In some examples, the transmitter 830 may include at least one RF transmitter, such as at least one RF transmitter operable to transmit over a dedicated radio frequency spectrum band and/or or a shared radio frequency spectrum band. The transmitter 830 may in some cases include separate transmitters for the dedicated radio frequency spectrum band and the shared radio frequency spectrum band. The separate transmitters may, in some examples, take the form of an LTE/LTE-A transmitter module for communicating over the dedicated radio frequency spectrum band (e.g., LTE/LTE-A transmitter module for dedicated RF spectrum band 832), and an LTE/LTE-A transmitter module for communicating over the shared radio frequency spectrum band (e.g., LTE/LTE-A transmitter module for shared RF spectrum band 834). The transmitter 830, including the LTE/LTE-A transmitter module for dedicated RF spectrum band 832 or the LTE/LTE-A transmitter module for shared RF spectrum band 834, may be used to transmit various types of data or control signals (i.e., transmissions) over one or more communication links of a wireless communication system, such as one or more communication links of the wireless communication system 100 or 200 described with reference to FIG. 1 or 2. The communication links may be established over one or more of a dedicated radio frequency spectrum band or a shared radio frequency spectrum band.

In some examples, the wireless communication management module 820 may be used to manage one or more aspects of wireless communication for the apparatus 805. In some examples, the wireless communication management module 820 may include a shared RF spectrum band monitoring module 835 or shared RF spectrum band access module 840. In some examples, the shared RF spectrum band monitoring module 835 may be used to monitor the at least one predetermined symbol period of the subframe for the indication that the other wireless device has obtained access to the shared radio frequency spectrum band (e.g., indication that a successful access procedure was performed).

The shared RF spectrum band access module 840 may manage the access procedures and subsequent transmissions using the shared radio frequency spectrum band, according to various examples. In the example of FIG. 8, the shared RF spectrum band access module 840 includes a CCA module 855, an access synchronization module 860, a preamble module 865, and an antenna determination module 870. The CCA module 855 may perform access procedure functions, such as CCA or eCCA procedures as discussed above. In examples, the CCA module 855 may perform the access procedures on a per antenna or per group of antennas, basis, and may determine that the shared radio frequency spectrum band is available for access on an antenna-by-antenna (or antenna group) basis, as discussed above. The access synchronization module 860 may perform access synchronization functions, such as synchronization for performing access procedures and synchronization of transmissions of preamble or data following successful channel access, similarly as discussed above. The preamble module 865 may generate preamble symbols that may be used to indicate reservation of a shared radio frequency spectrum band channel, such as a CUBS, in a manner such as discussed above. In certain examples, the preamble module 865 may manage FDM aspects of preamble transmissions of multiple devices. The antenna determination module 870 may determine one or more subsets of antennas associated with the apparatus 805 that may have cleared an access procedure for accessing the shared radio frequency spectrum band (e.g., determine which antennas were employed in a successful access procedure).

Figure 9:
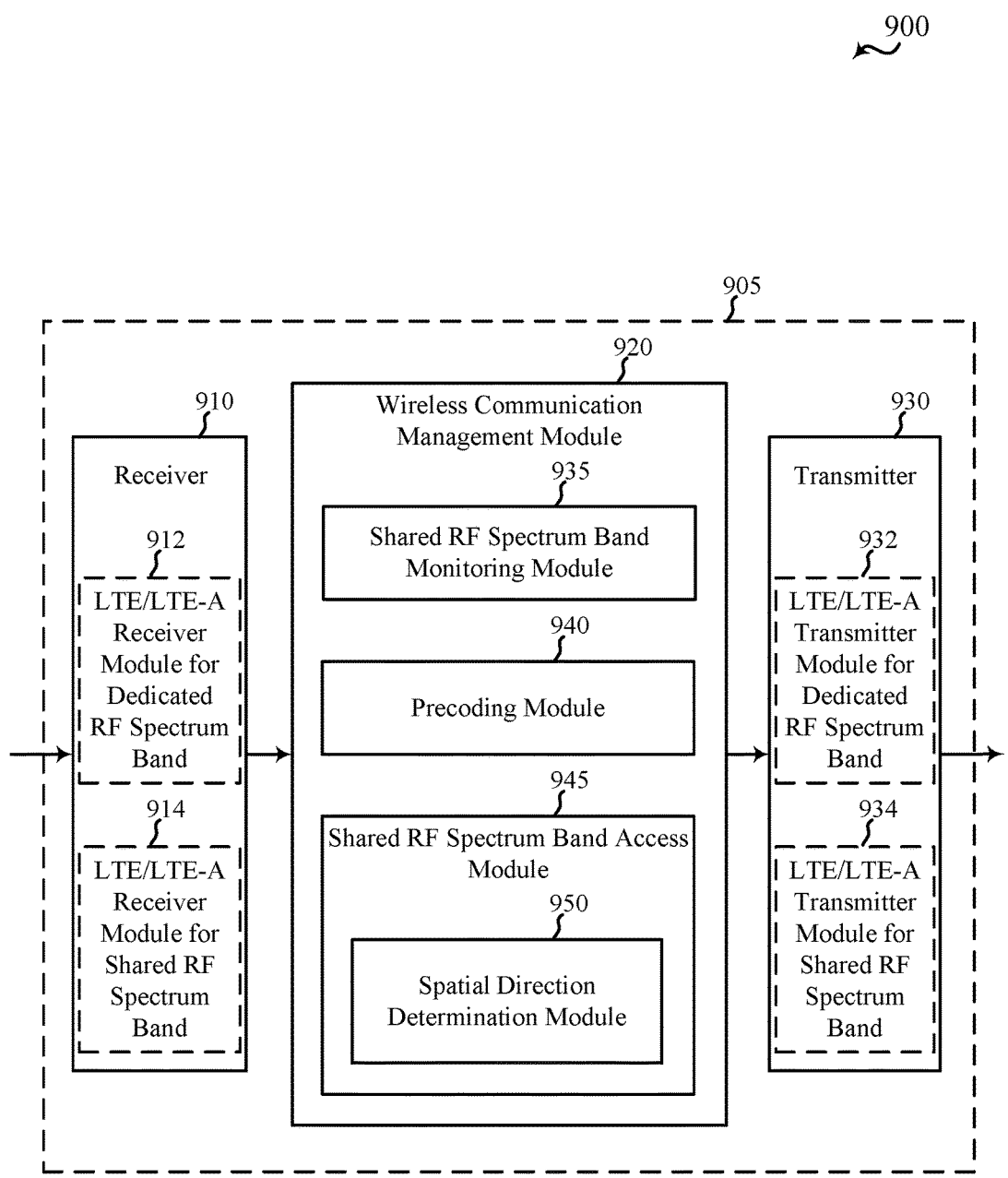
FIG. 9 illustrates a block diagram of an apparatus configured for use in wireless communication, in accordance with aspects of the present disclosure.

FIG. 9 illustrates a block diagram 900 of an apparatus 905 for use in wireless communication, in accordance with aspects of the present disclosure. In some examples the apparatus 905 may be an example of aspects of one or more of the base stations 105, 205, 505, or 605 described with reference to FIG. 1, 2, 5A, 5B, or 6A, access points 655 or 665 described with reference to FIG. 6B. In some examples, apparatus 905 may be an example of aspects of one or more of the UEs 115, 215, 515, or 615 described with reference to FIG. 1, 2, 5A, 5B, 6A, or 6B. In some examples, the apparatus 905 may be an example of one or more aspects of the apparatuses 705 or 805 described with reference to FIG. 7 or 8. The apparatus 905 may also be or include a processor. The apparatus 905 may include a receiver 910, a wireless communication management module 920, or a transmitter 930. Each of these modules may be in communication with each other.

The modules of the apparatus 905 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver 910 may include at least one RF receiver, such as at least one RF receiver operable to receive transmissions over a dedicated radio frequency spectrum band and/or a shared radio frequency spectrum band. The dedicated radio frequency spectrum band may include a radio frequency spectrum band for which transmitting apparatuses may not be required to contend for access (e.g., a radio frequency spectrum band licensed to particular users for particular uses, such as a licensed radio frequency spectrum band usable for LTE/LTE-A communications). The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner). In various examples, the dedicated radio frequency spectrum band or the shared radio frequency spectrum band may be used for LTE/LTE-A communications, as described, for example, with reference to FIG. 1 or 2. The receiver 910 may in some cases include separate receivers for a dedicated radio frequency spectrum band and a shared radio frequency spectrum band. The separate receivers may, in some examples, take the form of an LTE/LTE-A receiver module for communicating over the dedicated radio frequency spectrum band (e.g., LTE/LTE-A receiver module for dedicated RF spectrum band 912), and an LTE/LTE-A receiver module for communicating over the shared radio frequency spectrum band (e.g., LTE/LTE-A receiver module for shared RF spectrum band 914). The receiver 910, including the LTE/LTE-A receiver module for dedicated RF spectrum band 912 or the LTE/LTE-A receiver module for shared RF spectrum band 914, may be used to receive various types of data or control signals (i.e., transmissions) over one or more communication links of a wireless communication system, such as one or more communication links of the wireless communication system 100 or 200 described with reference to FIG. 1 or 2. The communication links may be established over one or more of a dedicated radio frequency spectrum band or a shared radio frequency spectrum band.

In some examples, the transmitter 930 may include at least one RF transmitter, such as at least one RF transmitter operable to transmit over a dedicated radio frequency spectrum band or a shared radio frequency spectrum band. The transmitter 930 may in some cases include separate transmitters for a dedicated radio frequency spectrum band and a shared radio frequency spectrum band. The separate transmitters may, in some examples, take the form of an LTE/LTE-A transmitter module for communicating over the dedicated radio frequency spectrum band (e.g., LTE/LTE-A transmitter module for dedicated RF spectrum band 932), and an LTE/LTE-A transmitter module for communicating over the shared radio frequency spectrum band (e.g., LTE/LTE-A transmitter module for shared RF spectrum band 934). The transmitter 930, including the LTE/LTE-A transmitter module for dedicated RF spectrum band 932 or the LTE/LTE-A transmitter module for shared RF spectrum band 934, may be used to transmit various types of data or control signals (i.e., transmissions) over one or more communication links of a wireless communication system, such as one or more communication links of the wireless communication system 100 or 200 described with reference to FIG. 1 or 2. The communication links may be established over one or more of a shared radio frequency spectrum band or a dedicated radio frequency spectrum band.

In some examples, the wireless communication management module 920 may be used to manage one or more aspects of wireless communication for the apparatus 905. In some examples, the wireless communication management module 920 may include a shared RF spectrum monitoring module 935, a precoding module 940, or shared RF spectrum band access module 945. In some examples, the shared RF spectrum monitoring module 935 may be used to monitor the at least one predetermined symbol period of the subframe for the indication that the other wireless device has obtained access to the shared radio frequency spectrum band (e.g., indication that a successful access procedure was performed).

The shared RF spectrum band access module 945 may manage the access procedures and subsequent transmissions using the shared radio frequency spectrum band, according to various examples. The precoding module 940 may perform precoding functions for transmissions and receptions at the apparatus 905 according to established precoding techniques. In the example of FIG. 9, the shared RF spectrum band access module 945 includes a spatial direction determination module 950. The spatial direction determination module 950 may perform or otherwise control directional CCA functions, such as directional CCA or eCCA procedures as discussed above. In various examples these procedures may include determining a spatial direction associated with signals received by the receiver 910 and/or determining a spatial direction for the beamforming of transmissions by the transmitter 930. In various examples, beamforming techniques may be employed by the transmitter 930 to perform a directional access procedure, and aspects of the control of such beamforming techniques may be performed by one or more of the spatial direction determination module 950, wireless communication management module 920, or the transmitter 930.

Figure 10:
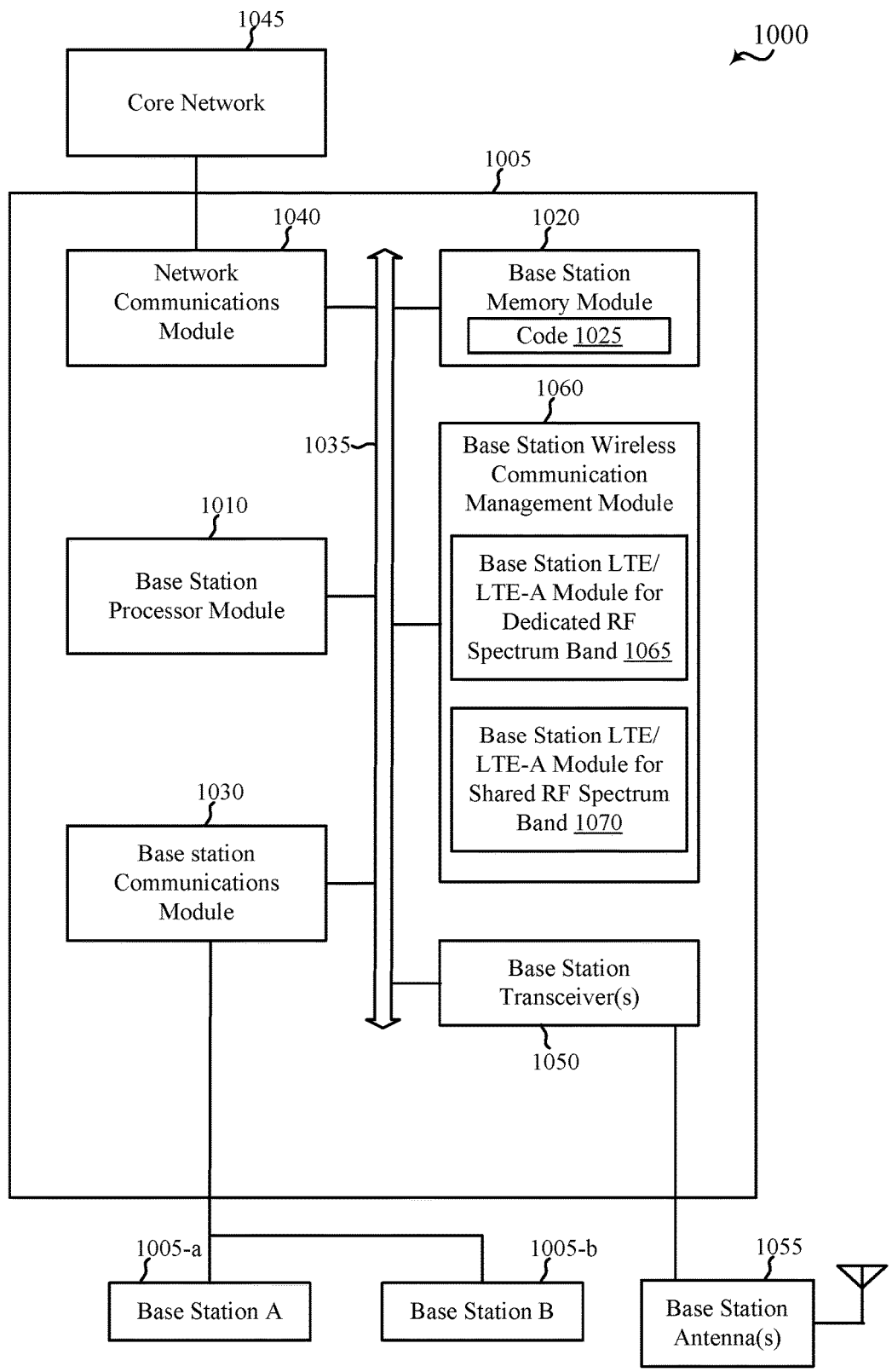
FIG. 10 illustrates a block diagram of a base station configured for use in wireless communication, in accordance with aspects of the present disclosure.

FIG. 10 illustrates a block diagram 1000 of a base station 1005 (e.g., a base station forming part or all of an eNB) configured for use in wireless communication, in accordance with aspects of the present disclosure. In some examples, the base station 1005 may be an example of one or more aspects of the base stations 105, 205, 505, or 605 described with reference to FIG. 1, 2, 5A, 5B, or 6A, or aspects of one or more of the apparatuses 705, 805, or 905 described with reference to FIG. 7, 8, or 9. The base station 1005 may be configured to implement or facilitate at least some of the base station features and functions described with reference to FIG. 1, 2, 3, 4A, 4A, 5A, 5B, 6A, 6B, 7, 8, or 9.

The base station 1005 may include a base station processor module 1010, a base station memory module 1020, at least one base station transceiver module (represented by base station transceiver(s) 1050), at least one base station antenna (represented by base station antenna(s) 1055 which may include co-located antenna(s) and/or distributed antenna(s)), or a base station wireless communication management module 1060. The antenna(s) 1055 may be connected to the base station 1005 via, for example, cables or fibers. The base station 1005 may also include one or more of a base station communications module 1030 or a network communications module 1040. Each of these components may be in communication with each other, directly or indirectly, over one or more buses 1035.

The base station memory module 1020 may include random access memory (RAM) or read-only memory (ROM). The base station memory module 1020 may store computer-readable, computer-executable code 1025 containing instructions that are configured to, when executed by the base station processor module 1010, cause the base station 1005 to perform various functions described herein related to wireless communication, including obtaining access to a shared radio frequency spectrum band, transmitting to a UE an indication that access to the shared radio frequency spectrum band has been obtained (with the indication conveying a symbol period including a starting symbol of a transmission to the UE), and making the transmission to the UE according to the indicated starting symbol. Alternatively, the code 1025 may not be directly executable by the base station processor module 1010 but be otherwise configured to cause the base station 1005 (e.g., when compiled and executed) to perform various of the functions described herein.

The base station processor module 1010 may include an intelligent hardware device, e.g., a CPU, a microcontroller, an ASIC, etc. The base station processor module 1010 may process information received through the base station transceiver(s) 1050, the base station communications module 1030, or the network communications module 1040. The base station processor module 1010 may also process information to be sent to the transceiver module(s) 1050 for transmission through the antenna(s) 1055, to the base station communications module 1030, for transmission to one or more other base stations 1005-*a* and 1005-*b*, or to the network communications module 1040 for transmission to a core network 1045, which may be an example of one or more aspects of the core network 130 described with reference to FIG. 1. The base station processor module 1010 may handle, alone or in connection with the base station wireless communication management module 1060, various aspects of communicating over (or managing communications over) a dedicated radio frequency spectrum band or a shared radio frequency spectrum band. The dedicated radio frequency spectrum band may include a radio frequency spectrum band for which transmitting apparatuses may not be required to contend for access (e.g., a radio frequency spectrum band licensed to particular users for particular uses, such as a licensed radio frequency spectrum band usable for LTE/LTE-A communications). The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner).

The base station transceiver(s) 1050 may include a modem configured to modulate packets and provide the modulated packets to the base station antenna(s) 1055 for transmission, and to demodulate packets received from the base station antenna(s) 1055. The base station transceiver(s) 1050 may, in some examples, be implemented as one or more base station transmitter modules and one or more separate base station receiver modules. The base station transceiver(s) 1050 may perform the functions of, or otherwise be examples of one or more of receivers 710, 810, or 910 or transmitters 730, 830, or 930 described with reference to FIG. 7, 8, or 9.

The base station transceiver(s) 1050 may support communications in a dedicated radio frequency spectrum band or a shared radio frequency spectrum band. The base station transceiver(s) 1050 may be configured to communicate bi-directionally, via the antenna(s) 1055, with one or more base stations, UEs, or apparatuses, such as one or more of the base stations 105, 205, 505, or 605 described with reference to FIG. 1, 2, 5A, 5B, 6A, or 6B, or the UEs 115, 215, 515, or 615 described with reference to FIG. 1, 2, 5A, 5B, 6A or 6B. The base station 1005 may, for example, include multiple base station antennas 1055 (e.g., an antenna array). The base station 1005 may communicate with the core network 1045 through the network communications module 1040. The base station 1005 may also communicate with other base stations, such as the base stations 1005-*a* and 1005-*b*, using the base station communications module 1030. Other base stations 1005-*a* and 1005-*b* may include, for example, other base stations associated with a cell of base station 1005, and may coordinate with base station 1005 to perform antenna-based or directional access procedures.

The base station wireless communication management module 1060 may be configured to perform or control some or all of the features or functions described with reference to FIG. 1, 2, 3, 4A, 4B, 5A, 5B, 6A, 6B, 7, 8, or 9 related to wireless communication over the dedicated radio frequency spectrum band or the shared radio frequency spectrum band. For example, the base station wireless communication management module 1060 may be configured to support a supplemental downlink mode (e.g., a licensed assisted access mode), a carrier aggregation mode, or a standalone mode using the dedicated radio frequency spectrum band or the shared radio frequency spectrum band. The base station wireless communication management module 1060 may include a base station LTE/LTE-A module for dedicated RF spectrum band 1065 configured to handle LTE/LTE-A communications in the dedicated radio frequency spectrum band, and a base station LTE/LTE-A module for shared RF spectrum band 1070 configured to handle LTE/LTE-A communications in the shared radio frequency spectrum band. The base station wireless communication management module 1060, or portions of it, may include a processor, or some or all of the functions of the base station wireless communication management module 1060 may be performed by the base station processor module 1010 or in connection with the base station processor module 1010. In some examples, the base station wireless communication management module 1060 may be an example of the wireless communication management module 720, 820, or 920 described with reference to FIG. 7, 8, or 9.

Figure 11:
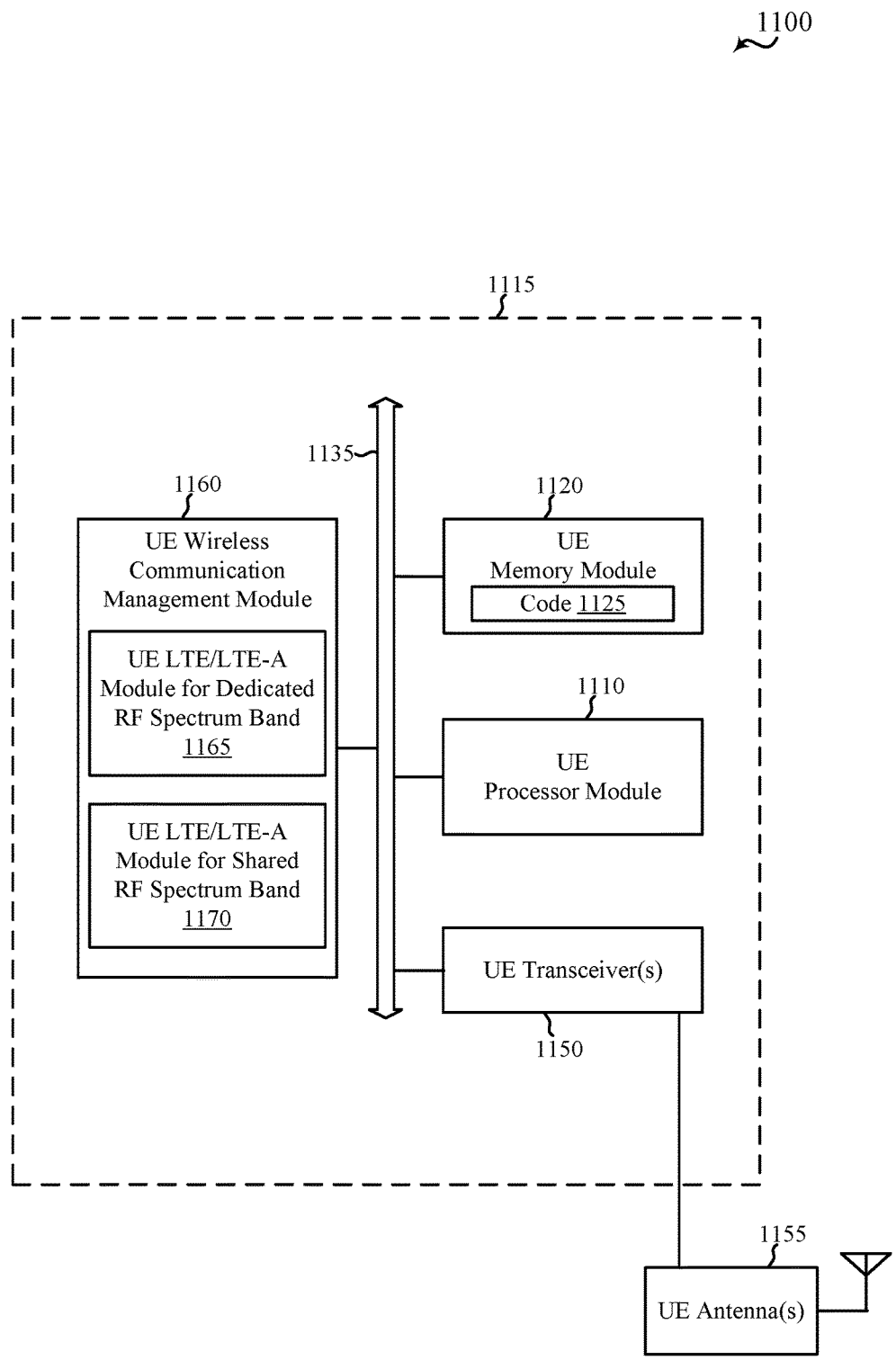
FIG. 11 illustrates a block diagram of a multiple-input/multiple-output communication system including a base station and a UE, in accordance with aspects of the present disclosure.

FIG. 11 illustrates a block diagram 1100 of a UE 1115 configured for use in wireless communication, in accordance with aspects of the present disclosure. In some examples, the UE 1115 may be an example of one or more aspects of the UEs 115, 215, 515, or 615 described with reference to FIG. 1, 2, 5A, 5B, 6A, or 6B, or the apparatuses 705, 805, or 905 described with reference to FIG. 7, 8, or 9. The UE 1115 may be configured to implement or facilitate at least some of the UE features and functions described with reference to FIG. 1, 2, 3, 4A, 4A, 5A, 5B, 6A, 6B, 7, 8, or 9.

The UE 1115 may include a UE processor module 1110, a UE memory module 1120, at least one UE transceiver module (represented by UE transceiver(s) 1150), at least one UE antenna (represented by UE antenna(s) 1155 which may include co-located antenna(s) and/or distributed antenna(s)), or a UE wireless communication management module 1160. The antenna(s) 1155 may be connected to the UE 1115 via, for example, cables or fibers. Each of these components may be in communication with each other, directly or indirectly, over one or more buses 1135.

The UE memory module 1120 may include RAM or ROM. The UE memory module 1120 may store computer-readable, computer-executable code 1125 containing instructions that are configured to, when executed by the UE processor module 1110, cause the UE 1115 to perform various functions described herein related to wireless communication, including obtaining access to a shared radio frequency spectrum band, transmitting an indication that access to the shared radio frequency spectrum band has been obtained (with the indication conveying a symbol period including a starting symbol of a transmission), and making the transmission according to the indicated starting symbol. Alternatively, the code 1125 may not be directly executable by the UE processor module 1110 but be otherwise configured to cause the UE 1155 (e.g., when compiled and executed) to perform various of the functions described herein.

The UE processor module 1110 may include an intelligent hardware device, e.g., a CPU, a microcontroller, an ASIC, etc. The UE processor module 1110 may process information received through the UE transceiver(s) 1150. The UE processor module 1110 may also process information to be sent to the UE transceiver(s) 1150 for transmission through the UE antenna(s) 1155. The UE processor module 1110 may handle, alone or in connection with the UE wireless communication management module 1160, various aspects of communicating over (or managing communications over) a dedicated radio frequency spectrum band or a shared radio frequency spectrum band. The dedicated radio frequency spectrum band may include a radio frequency spectrum band for which transmitting apparatuses may not be required to contend for access (e.g., a radio frequency spectrum band licensed to particular users for particular uses, such as a licensed radio frequency spectrum band usable for LTE/LTE-A communications). The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner).

The UE transceiver(s) 1150 may include a modem configured to modulate packets and provide the modulated packets to the UE antenna(s) 1155 for transmission, and to demodulate packets received from the UE antenna(s) 1155. The UE transceiver(s) 1150 may, in some examples, be implemented as one or more UE transmitter modules and one or more separate UE receiver modules. The UE transceiver modules(s) may perform the functions of, or otherwise be examples of one or more of receivers 710, 810, or 910 or transmitters 730, 830, or 930 described with reference to FIG. 7, 8, or 9.

The UE transceiver(s) 1150 may support communications in a dedicated radio frequency spectrum band or a shared radio frequency spectrum band. The UE transceiver(s) 1150 may be configured to communicate bi-directionally, via the UE antenna(s) 1155, with one or more base stations, UEs, or apparatuses, such as one or more of the base stations 105, 205, 505, or 605 described with reference to FIG. 1, 2, 5A, 5B, 6A, or 6B, or the UEs 115, 215, 515, or 615 described with reference to FIG. 1, 2, 5A, 5B, 6A or 6B. The UE 1115 may, for example, include multiple UE antennas 1155 (e.g., an antenna array).

The UE wireless communication management module 1160 may be configured to perform or control some or all of the features or functions described with reference to FIG. 1, 2, 3, 4A, 4B, 5A, 5B, 6A, 6B, 7, 8, or 9 related to wireless communication over the dedicated radio frequency spectrum band or the shared radio frequency spectrum band. For example, the UE wireless communication management module 1160 may be configured to support a supplemental downlink mode (e.g., a licensed assisted access mode), a carrier aggregation mode, or a standalone mode using the dedicated radio frequency spectrum band or the shared radio frequency spectrum band. The UE wireless communication management module 1160 may include a UE LTE/LTE-A module for dedicated RF spectrum band 1165 configured to handle LTE/LTE-A communications in the dedicated radio frequency spectrum band, and a UE LTE/LTE-A module for shared RF spectrum band 1170 configured to handle LTE/LTE-A communications in the shared radio frequency spectrum band. The UE wireless communication management module 1160, or portions of it, may include a processor, or some or all of the functions of the UE wireless communication management module 1160 may be performed by the UE processor module 1110 or in connection with the UE processor module 1110. In some examples, the UE wireless communication management module 1160 may be an example of the wireless communication management module 720, 820, or 920 described with reference to FIG. 7, 8, or 9.

Figure 12:
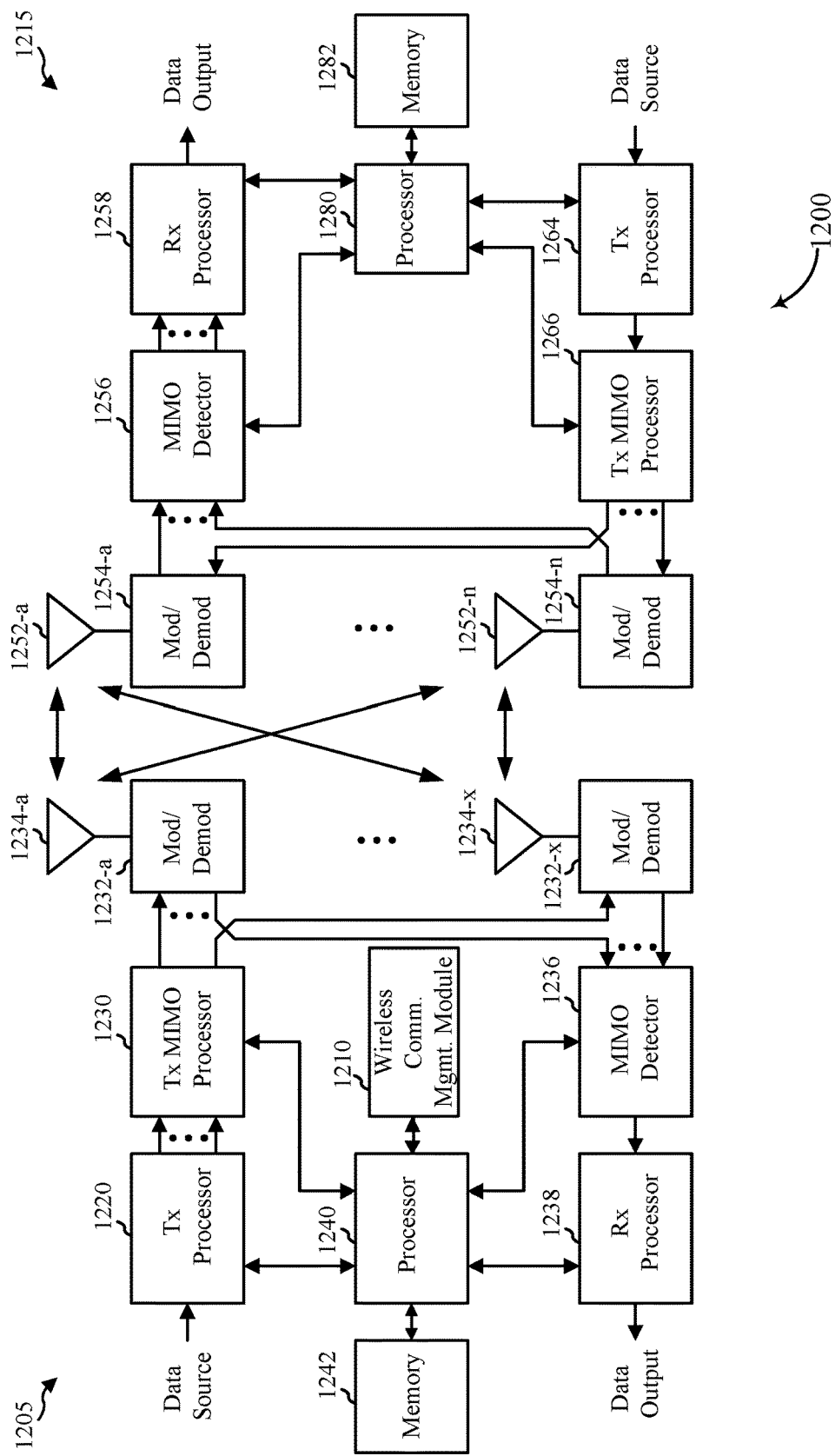
FIG. 12 is a flow chart illustrating an exemplary method for wireless communication, in accordance with aspects of the present disclosure.

FIG. 12 illustrates a block diagram of a multiple input/multiple output (MIMO) communication system 1200 including a base station 1205 and a UE 1215, in accordance with aspects of the present disclosure. The MIMO communication system 1200 may illustrate aspects of the wireless communication systems 100, 200, 500, 600, or 650 shown in FIG. 1, 2, 5A, 5B, 6A, or 6B. The base station 1205 may be equipped with antennas 1234-*a* through 1234-*x*, and the UE 1215 may be equipped with antennas 1252-*a* through 1252-*n*. In the MIMO communication system 1200, the base station 1205 may be able to send data over multiple communication links at the same time. Each communication link may be called a "layer" and the "rank" of the communication link may indicate the number of layers used for communication. For example, in a 2×2 MIMO communications system where base station 1205 transmits two "layers," the rank of the communication link between the base station 1205 and the UE 1215 is two.

At the base station 1205, a transmit processor 1220 may receive data from a data source. The transmit processor 1220 may process the data. The transmit processor 1220 may also generate control symbols and/or reference symbols. A transmit (TX) MIMO processor 1230 may perform spatial processing (e.g., precoding) on data symbols, control symbols, and/or reference symbols, if applicable, and may provide output symbol streams to the modulator/demodulator (mod/demod) modules 1232-*a* through 1232-*x*. Each modulator/demodulator module 1232 may process a respective output symbol stream (e.g., for OFDM, etc.) to obtain an output sample stream. Each modulator/demodulator module 1232 may further process (e.g., convert to analog, amplify, filter, and upconvert) the output sample stream to obtain a DL signal. In one example, DL signals from modulator/demodulator modules 1232-*a* through 1232-*x* may be transmitted via the antennas 1234-*a* through 1234-*x*, respectively.

At the UE 1215, the UE antennas 1252-*a* through 1252-*n* may receive the DL signals from the base station 1205 and may provide the received signals to the modulator/demodulator modules 1254-*a* through 1254-*n*, respectively. Each modulator/demodulator module 1254 may condition (e.g., filter, amplify, downconvert, and digitize) a respective received signal to obtain input samples. Each modulator/demodulator module 1254 may further process the input samples (e.g., for OFDM, etc.) to obtain received symbols. A MIMO detector 1256 may obtain received symbols from all the modulator/demodulator modules 1254-*a* through 1254-*n*, perform MIMO detection on the received symbols, if applicable, and provide detected symbols. A receive processor 1258 may process (e.g., demodulate, deinterleave, and decode) the detected symbols, providing decoded data for the UE 1215 to a data output, and provide decoded control information to a processor 1280, or memory 1282.

The processor 1280 may in some cases execute stored instructions to instantiate one or more of a wireless communication management module 1210. The wireless communication management module 1210 may be an example of one or more aspects of the wireless communication management modules 720, 820, 920, or 1060 described with reference to FIG. 7, 8, 9, or 10.

On the uplink (UL), at the UE 1215, a transmit processor 1264 may receive and process data from a data source. The transmit processor 1264 may also generate reference symbols for a reference signal. The symbols from the transmit processor 1264 may be precoded by a transmit MIMO processor 1266 if applicable, further processed by the modulator/demodulator modules 1254-*a* through 1254-*n* (e.g., for SC-FDMA, etc.), and be transmitted to the base station 1205 in accordance with the transmission parameters received from the base station 1205. At the base station 1205, the UL signals from the UE 1215 may be received by the antennas 1234, processed by the modulator/demodulator modules 1232, detected by a MIMO detector 1236 if applicable, and further processed by a receive processor 1238. The receive processor 1238 may provide decoded data to a data output and to the processor 1240 and/or memory 1242.

The components of the UE 1215 may, individually or collectively, be implemented with one or more ASICs adapted to perform some or all of the applicable functions in hardware. Each of the noted modules may be a means for performing one or more functions related to operation of the MIMO communication system 1200. Similarly, the components of the base station 105-*c* may, individually or collectively, be implemented with one or more ASICs adapted to perform some or all of the applicable functions in hardware. Each of the noted components may be a means for performing one or more functions related to operation of the MIMO communication system 1200.

Figure 13:
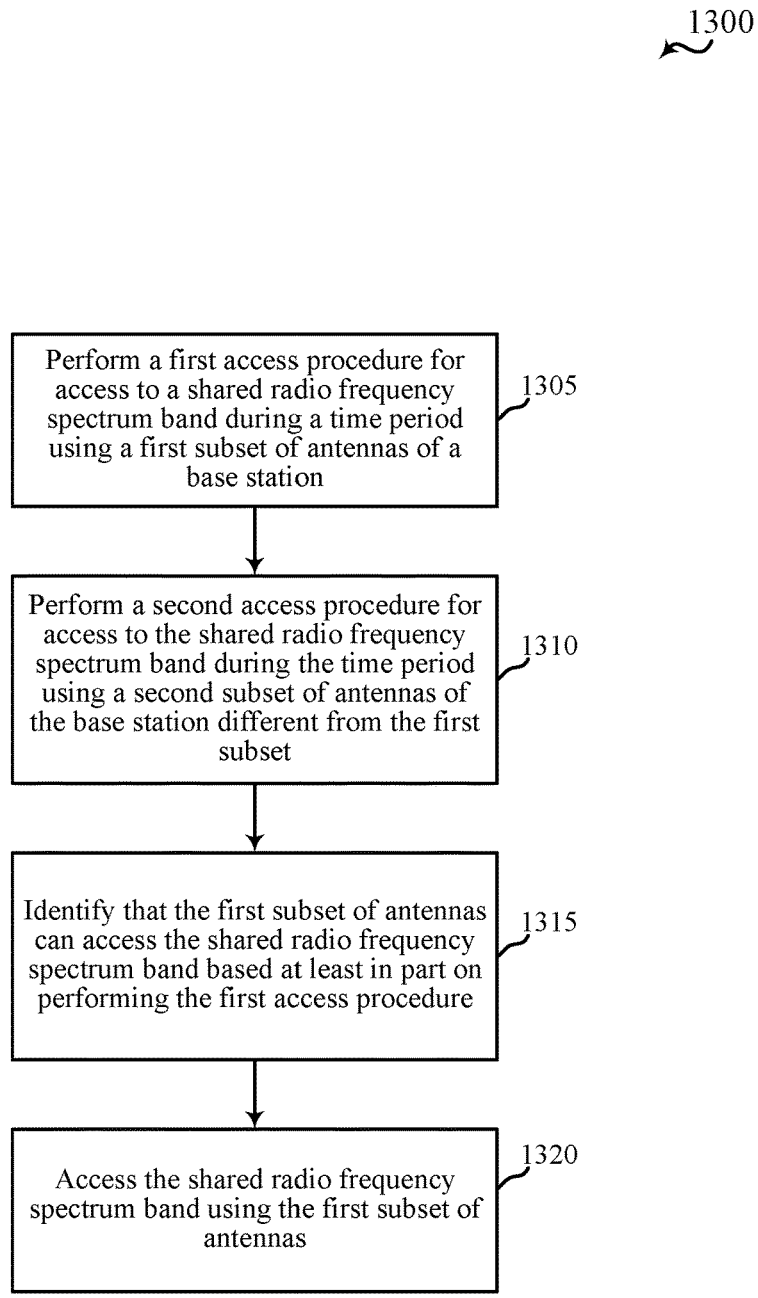
FIG. 13 is a flow chart illustrating an exemplary method for wireless communication, in accordance with aspects of the present disclosure.

FIG. 13 is a flow chart illustrating an exemplary method 1300 for wireless communication, in accordance with aspects of the present disclosure. For clarity, the exemplary method 1300 is described below with reference to aspects of one or more of the base stations 105, 205, 505, 605, or 1005 described with reference to FIG. 1, 2, 5, 6A, or 10, aspects of one or more of access points 655 or 665 of FIG. 6B, or aspects of one or more of the apparatuses 705, 805, or 905 described with reference to FIG. 7, 8, or 9. In some examples, a base station or apparatus may execute one or more sets of codes to control the functional elements of the base station or apparatus to perform the functions described below. Additionally or alternatively, the base station or apparatus may perform one or more of the functions described below using special-purpose hardware.

At block 1305, the exemplary method 1300 may include performing a first access procedure for access to a shared radio frequency spectrum band during a time period using a first subset of antennas of a base station. The operation(s) at block 1305 may be performed, for example, using any one or more of wireless communication management modules 720, 820, 920, 1060, or 1210, receivers 710, 810, 910, or transmitters 730, 830, 930 described with reference to FIG. 7, 8, 9, 10, or 12.

At block 1310, the exemplary method 1300 may include performing a second access procedure for access to the shared radio frequency spectrum band during the time period using a second subset of antennas of the base station different from the first subset. The operation(s) at block 1310 may be performed, for example, using any one or more of wireless communication management modules 720, 820, 920, 1060, or 1210, receivers 710, 810, 910, or transmitters 730, 830, 930 described with reference to FIG. 7, 8, 9, 10, or 12.

At block 1315, the exemplary method 1300 may include identifying that the first subset of antennas can access the shared radio frequency spectrum band based at least in part on performing the first access procedure. The operation(s) at block 1315 may be performed, for example, using any one or more of wireless communication management modules 720, 820, 920, 1060, or 1210 described with reference to FIG. 7, 8, 9, 10, or 12, shared RF spectrum band access module 740, or 840 of FIG. 7 or 8, or antenna determination module 745 or 780 of FIG. 7 or 8.

At block 1320, the exemplary method 1300 may include accessing the shared radio frequency spectrum band using the first subset of antennas. The operation(s) at block 1320 may be performed, for example, using any one or more of wireless communication management modules 720, 820, 920, 1060, or 1210, receivers 710, 810, 910, or transmitters 730, 830, 930 described with reference to FIG. 7, 8, 9, 10, or 12.

Thus, the exemplary method 1300 may provide for wireless communication. It should be noted that the exemplary method 1300 is just one implementation and that the operations of the exemplary method 1300 may be rearranged or otherwise modified such that other implementations are possible.

Figure 14:
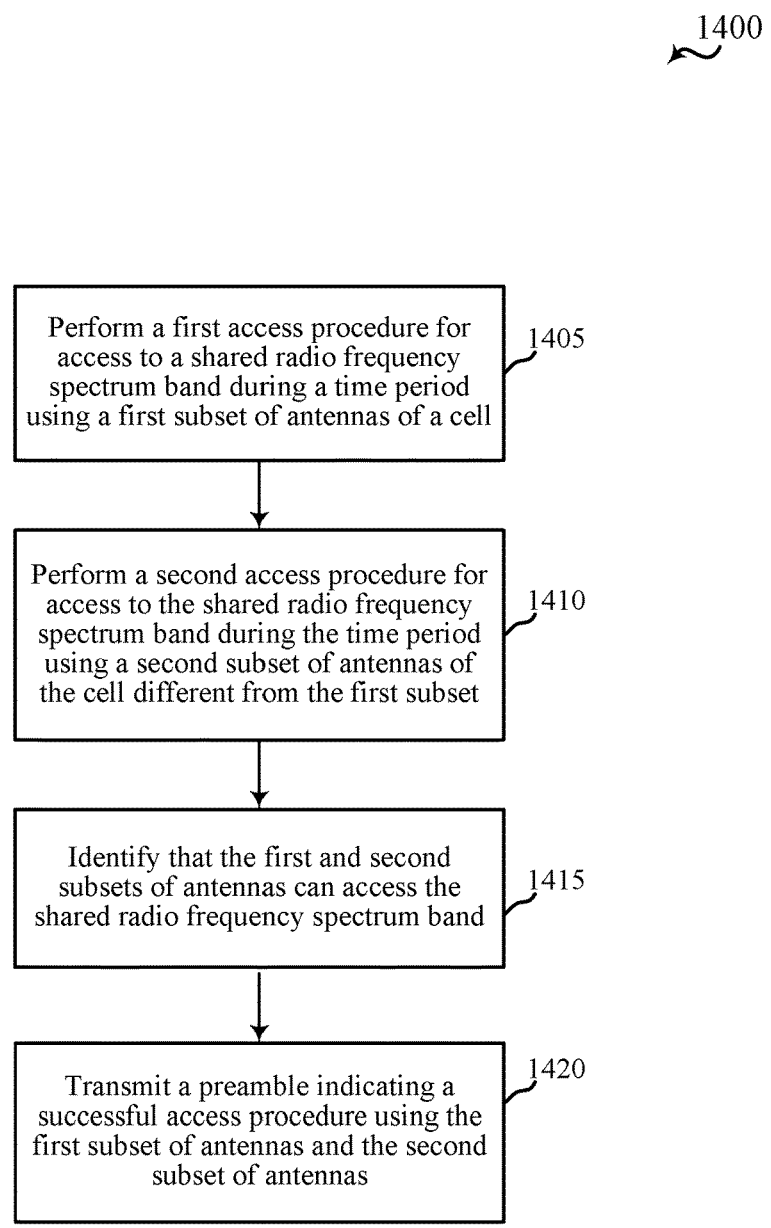
FIG. 14 is a flow chart illustrating an exemplary method for wireless communication, in accordance with aspects of the present disclosure.

FIG. 14 is a flow chart illustrating an exemplary method 1400 for wireless communication, in accordance with aspects of the present disclosure. For clarity, the exemplary method 1400 is described below with reference to aspects of one or more of the base stations 105, 205, 505, 605, or 1005 described with reference to FIG. 1, 2, 5, 6A, or 10, aspects of one or more of access points 655 or 665 of FIG. 6B, or aspects of one or more of the apparatuses 705, 805, or 905 described with reference to FIG. 7, 8, or 9. In some examples, a base station or apparatus may execute one or more sets of codes to control the functional elements of the base station or apparatus to perform the functions described below. Additionally or alternatively, the base station or apparatus may perform one or more of the functions described below using special-purpose hardware.

At block 1405, the exemplary method 1400 may include performing a first access procedure for access to a shared radio frequency spectrum band during a time period using a first subset of antennas of a base station. The operation(s) at block 1405 may be performed, for example, using any one or more of wireless communication management modules 720, 820, 920, 1060, or 1210, receivers 710, 810, 910, or transmitters 730, 830, 930 described with reference to FIG. 7, 8, 9, 10, or 12.

At block 1410, the exemplary method 1400 may include performing a second access procedure for access to the shared radio frequency spectrum band during the time period using a second subset of antennas of the base station different from the first subset. The operation(s) at block 1410 may be performed, for example, using any one or more of wireless communication management modules 720, 820, 920, 1060, or 1210, receivers 710, 810, 910, or transmitters 730, 830, 930 described with reference to FIG. 7, 8, 9, 10, or 12.

At block 1415, the exemplary method 1400 may include identifying that the first and second subsets of antennas can access the shared radio frequency spectrum band. The operation(s) at block 1415 may be performed, for example, using any one or more of wireless communication management modules 720, 820, 920, 1060, or 1210 described with reference to FIG. 7, 8, 9, 10, or 12, shared RF spectrum band access modules 740, or 840 of FIG. 7 or 8, or antenna determination modules 745 or 780 of FIG. 7 or 8.

At block 1420, the exemplary method 1400 may include transmitting a preamble indicating a successful access procedure using the first subset of antennas and the second subset of antennas. The operation(s) at block 1420 may be performed, for example, using any one or more of wireless communication management modules 720, 820, 920, 1060, or 1210, transmitters 730, 830, 930 described with reference to FIG. 7, 8, 9, 10, or 12, or the preamble module 865 described with reference to FIG. 8.

Thus, the exemplary method 1400 may provide for wireless communication. It should be noted that the exemplary method 1400 is just one implementation and that the operations of the exemplary method 1400 may be rearranged or otherwise modified such that other implementations are possible.

Figure 15:
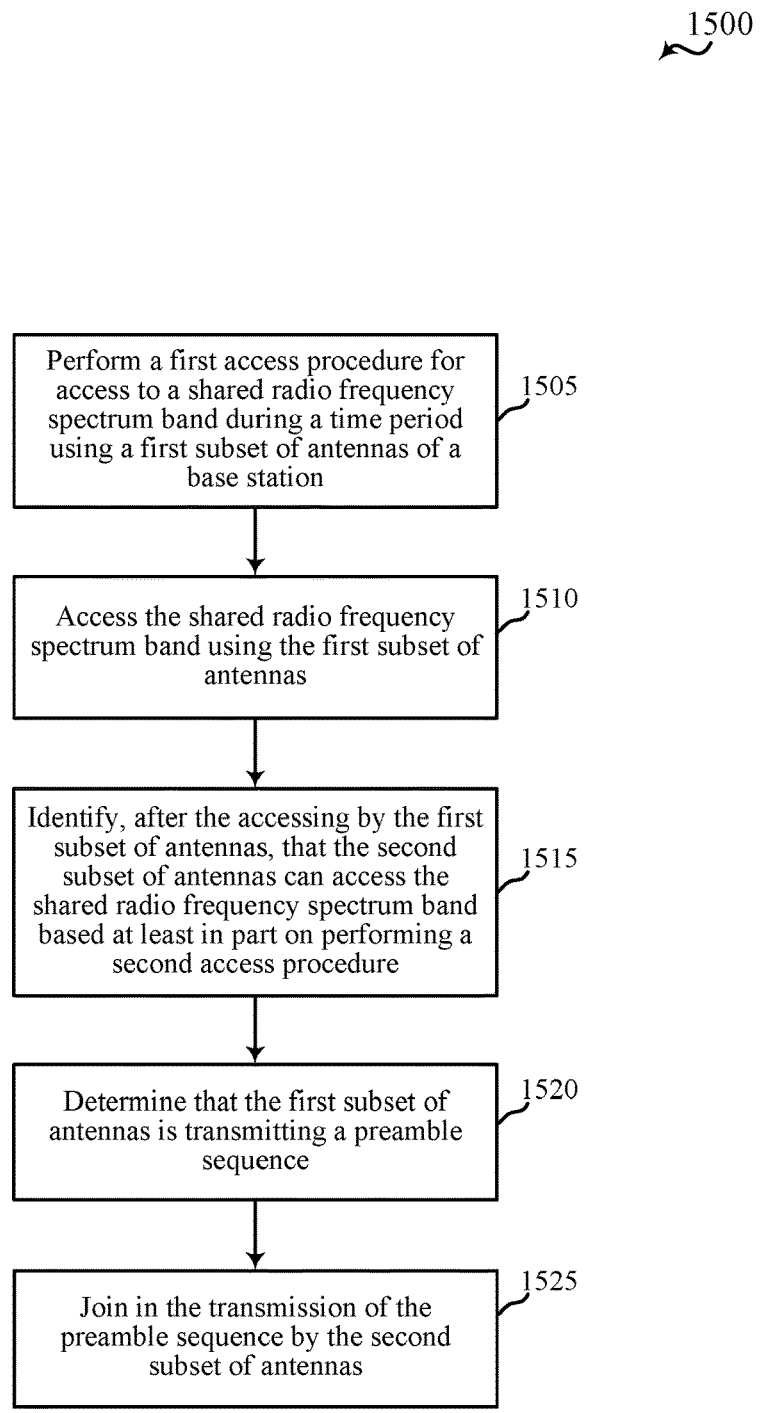
FIG. 15 is a flow chart illustrating an exemplary method for wireless communication, in accordance with aspects of the present disclosure.

FIG. 15 is a flow chart illustrating an exemplary method 1500 for wireless communication, in accordance with aspects of the present disclosure. For clarity, the exemplary method 1500 is described below with reference to aspects of one or more of the base stations 105, 205, 505, 605, or 1005 described with reference to FIG. 1, 2, 5, 6A, or 10, aspects of one or more of access points 655 or 665 of FIG. 6B, or aspects of one or more of the apparatuses 705, 805, or 905 described with reference to FIG. 7, 8, or 9. In some examples, a base station or apparatus may execute one or more sets of codes to control the functional elements of the base station or apparatus to perform the functions described below. Additionally or alternatively, the base station or apparatus may perform one or more of the functions described below using special-purpose hardware.

At block 1505, the exemplary method 1500 may include performing a first access procedure for access to a shared radio frequency spectrum band during a time period using a first subset of antennas of a base station. The operation(s) at block 1505 may be performed, for example, using any one or more of wireless communication management modules 720, 820, 920, 1060, or 1210, receivers 710, 810, 910, or transmitters 730, 830, 930 described with reference to FIG. 7, 8, 9, 10, or 12.

At block 1510, the exemplary method 1500 may include accessing the shared radio frequency spectrum band using the first subset of antennas. The operation(s) at block 1510 may be performed, for example, using any one or more of wireless communication management modules 720, 820, 920, 1060, or 1210, receivers 710, 810, 910, or transmitters 730, 830, 930 described with reference to FIG. 7, 8, 9, 10, or 12.

At block 1515, the exemplary method 1500 may include identifying, after the accessing by the first subset of antennas, that the second subset of antennas can access the shared radio frequency spectrum band based at least in part on performing a second access procedure. The operation(s) at block 1515 may be performed, for example, using any one or more of wireless communication management modules 720, 820, 920, 1060, or 1210, receivers 710, 810, 910, or transmitters 730, 830, 930 described with reference to FIG. 7, 8, 9, 10, or 12.

At block 1520, the exemplary method 1500 may include determining that the first subset of antennas is transmitting a preamble sequence. The operation(s) at block 1520 may be performed, for example, using any one or more of wireless communication management modules 720, 820, 920, 1060, or 1210, transmitters 730, 830, 930 described with reference to FIG. 7, 8, 9, 10, or 12, or the preamble module 865 described with reference to FIG. 8.

At block 1525, the exemplary method 1500 may include joining in the transmission of the preamble sequence by the second subset of antennas. The operation(s) at block 1525 may be performed, for example, using any one or more of wireless communication management modules 720, 820, 920, 1060, or 1210, transmitters 730, 830, 930 described with reference to FIG. 7, 8, 9, 10, or 12, or the preamble module 865 described with reference to FIG. 8.

Thus, the exemplary method 1500 may provide for wireless communication. It should be noted that the exemplary method 1500 is just one implementation and that the operations of the exemplary method 1500 may be rearranged or otherwise modified such that other implementations are possible.

Figure 16:
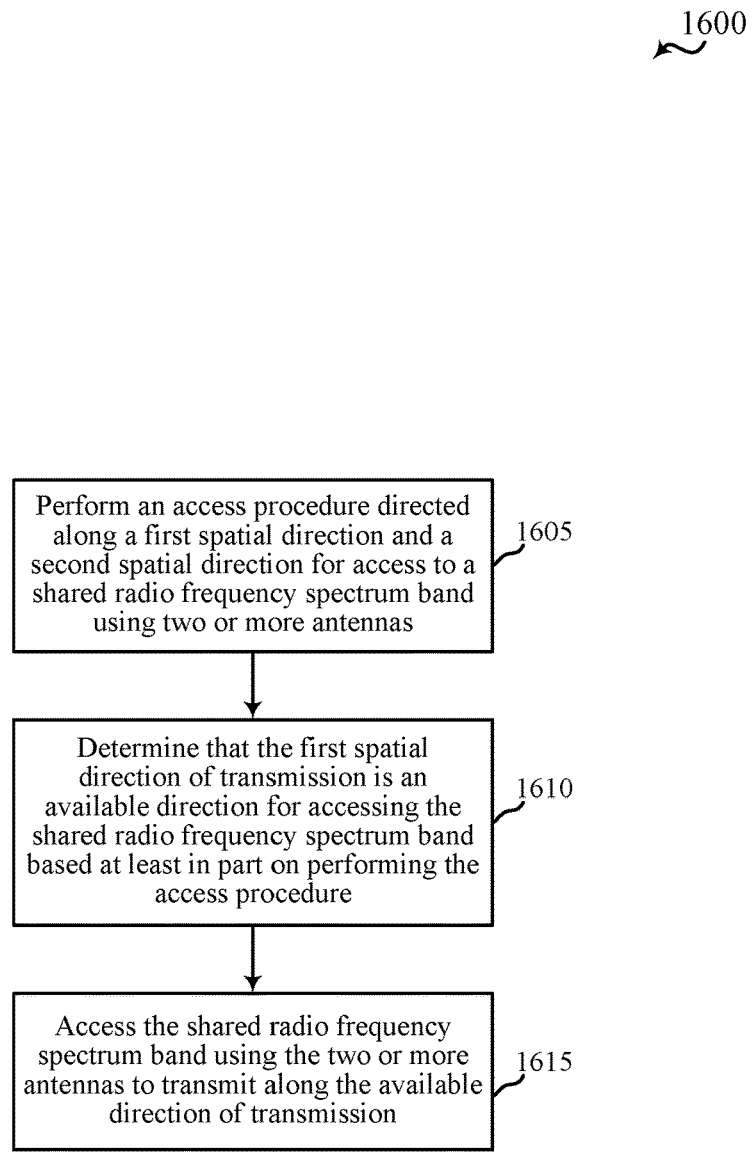
FIG. 16 is a flow chart illustrating an exemplary method for wireless communication, in accordance with aspects of the present disclosure.

FIG. 16 is a flow chart illustrating an exemplary method 1600 for wireless communication, in accordance with aspects of the present disclosure. For clarity, the exemplary method 1600 is described below with reference to aspects of one or more of the base stations 105, 205, 505, 605, or 1005 described with reference to FIG. 1, 2, 5, 6A, or 10, aspects of one or more of access points 655 or 665 of FIG. 6B, or aspects of one or more of the apparatuses 705, 805, or 905 described with reference to FIG. 7, 8, or 9. In some examples, a base station or apparatus may execute one or more sets of codes to control the functional elements of the base station or apparatus to perform the functions described below. Additionally or alternatively, the base station or apparatus may perform one or more of the functions described below using special-purpose hardware.

At block 1605, the exemplary method 1600 may include performing an access procedure directed along a first spatial direction and a second spatial direction for access to a shared radio frequency spectrum band using two or more antennas. The operation(s) at block 1605 may be performed, for example, using any one or more of wireless communication management modules 720, 820, 920, 1060, or 1210, receivers 710, 810, 910, or transmitters 730, 830, 930 described with reference to FIG. 7, 8, 9, 10, or 12.

At block 1610, the exemplary method 1600 may include determining that the first spatial direction of transmission is an available direction for accessing the shared radio frequency spectrum band based at least in part on performing the access procedure. The operation(s) at block 1610 may be performed, for example, using any one or more of wireless communication management modules 720, 820, 920, 1060, or 1210, receivers 710, 810, 910, or transmitters 730, 830, 930 described with reference to FIG. 7, 8, 9, 10, or 12, or spatial direction determination module 950 described with reference to FIG. 9.

At block 1615, the exemplary method 1600 may include accessing the shared radio frequency spectrum band using the two or more antennas to transmit along the available direction of transmission. The operation(s) at block 1615 may be performed, for example, using any one or more of wireless communication management modules 720, 820, 920, 1060, or 1210, receivers 710, 810, 910, or transmitters 730, 830, 930 described with reference to FIG. 7, 8, 9, 10, or 12.

Thus, the exemplary method 1600 may provide for wireless communication. It should be noted that the exemplary method 1600 is just one implementation and that the operations of the exemplary method 1600 may be rearranged or otherwise modified such that other implementations are possible.

In some examples, aspects from two or more of the exemplary methods 1300, 1400, 1500, or 1600 may be combined. It should be noted that the exemplary methods 1300, 1400, 1500, or 1600 are just example implementations, and that the operations of the exemplary methods 1300, 1400, 1500, or 1600 may be rearranged or otherwise modified such that other implementations are possible.

Techniques described herein may be used for various wireless communications systems such as code-division multiple access (CDMA) systems, time-division multiple access (TDMA) systems, frequency-division multiple access (FDMA) systems, single-carrier frequency-division multiple access (SC-FDMA) systems, and orthogonal frequency-division multiple access (OFDMA) systems, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of communication at a base station, comprising:
   performing, at the base station, a first access procedure for access to a shared radio frequency spectrum band during a time period using a first subset of antennas associated with the base station;
   performing, at the base station, a second access procedure for access to the shared radio frequency spectrum band during the time period using a second subset of antennas associated with the base station different from the first subset of antennas;
   identifying, at the base station, that the first subset of antennas can access the shared radio frequency spectrum band based at least in part on performing the first access procedure; and
   accessing, at the base station, the shared radio frequency spectrum band using the first subset of antennas.

2. The method of claim 1, wherein the first access procedure and the second access procedure each comprise a clear channel assessment (CCA) using one or more antennas associated with the first subset of antennas and the second subset of antennas, respectively.

3. The method of claim 2, wherein the first subset of antennas comprises an antenna having a different geographic location from each antenna of the second subset of antennas.

4. The method of claim 1, wherein the accessing the shared radio frequency spectrum band using the first subset of antennas comprises transmitting a preamble indicating a successful access procedure using the first subset of antennas.

5. The method of claim 4, wherein the preamble comprises a common pilot signal associated with a logical antenna port, and wherein the logical antenna port is associated with at least one antenna from the first subset of antennas and at least one antenna from the second subset of antennas.

6. The method of claim 5, wherein the common pilot signal is transmitted from the at least one antenna from the first subset of antennas, and the common pilot signal is not transmitted from the at least one antenna from the second subset of antennas.

7. The method of claim 5, wherein the preamble further comprises an identifier that indicates which antennas are transmitting the common pilot signal.

8. The method of claim 4, wherein the preamble comprises one or more antenna-specific pilot signals, each associated with one or more antennas of the first subset of antennas.

9. The method of claim 4, wherein the preamble comprises one or more dedicated pilot signals associated with a receiver.

10. The method of claim 9, wherein each of the one or more dedicated pilot signals is transmitted using a logical antenna port and one or more physical antennas associated with the first subset of antennas are indicated using precoding.

11. The method of claim 1, further comprising:
    identifying that the second subset of antennas can access the shared radio frequency spectrum band during the time period based at least in part on performing the second access procedure; and accessing the shared radio frequency spectrum band using the first subset of antennas and the second subset of antennas.

12. The method of claim 11, wherein the accessing the shared radio frequency spectrum band using the first subset of antennas and the second subset of antennas comprises:
transmitting a preamble indicating a successful access procedure using the first subset of antennas and the second subset of antennas, the transmitting comprising frequency division multiplexing (FDM) the preamble between the first subset of antennas and the second subset of antennas.

13. The method of claim 11, wherein the accessing the shared radio frequency spectrum band using the first subset of antennas and the second subset of antennas comprises:
transmitting a preamble indicating a successful access procedure using the first subset of antennas and the second subset of antennas, the transmitting comprising transmitting different preamble symbols from the first subset of antennas and the second subset of antennas for a first portion of the preamble, and transmitting a same preamble symbol from the first subset of antennas and the second subset of antennas for a second portion of the preamble.

14. The method of claim 1, further comprising:
identifying that the second subset of antennas can access the shared radio frequency spectrum band after the first subset of antennas has accessed the shared radio frequency spectrum band; and
accessing the shared radio frequency spectrum band using the second subset of antennas.

15. The method of claim 14, wherein identifying that the second subset of antennas can access the shared radio frequency spectrum band comprises:
performing the second access procedure for access to the shared radio frequency spectrum band using the second subset of antennas, the second access procedure including cancelling of transmissions of the first subset of antennas.

16. The method of claim 15, further comprising:
coordinating downlink power control in the first subset of antennas to increase a likelihood that the second subset of antennas will gain channel access using the second access procedure.

17. The method of claim 14, wherein the accessing the shared radio frequency spectrum band using the second subset of antennas comprises:
determining that the first subset of antennas is transmitting a preamble sequence; and
the method further comprising joining in the transmitting the preamble sequence by the second subset of antennas.

18. The method of claim 14, further comprising:
performing a synchronized access procedure using the first subset of antennas and one or more antennas of the second subset of antennas.

19. The method of claim 14, further comprising:
performing an asynchronous access procedure using the first subset of antennas and one or more antennas of the second subset of antennas.

20. An apparatus for communication at a base station, comprising:
a processor;
memory in electronic communication with the processor; and
instructions stored in the memory; wherein the instructions are executable by the processor to cause the apparatus to:
perform, at the base station, a first access procedure for access to a shared radio frequency spectrum band during a time period using a first subset of antennas associated with the base station;
perform, at the base station, a second access procedure for access to the shared radio frequency spectrum band during the time period using a second subset of antennas associated with the base station different from the first subset of antennas;
identify, at the base station, that the first subset of antennas can access the shared radio frequency spectrum band based at least in part on performing the first access procedure; and
access, at the base station, the shared radio frequency spectrum band using the first subset of antennas.

* * * * *